(12) United States Patent
Suzuki

(10) Patent No.: US 7,743,229 B2
(45) Date of Patent: Jun. 22, 2010

(54) IMAGE READING APPARATUS, HOST APPARATUS AND IMAGE READING SYSTEM

(75) Inventor: Nobuhiko Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 560 days.

(21) Appl. No.: 11/738,097

(22) Filed: Apr. 20, 2007

(65) Prior Publication Data

US 2007/0255918 A1 Nov. 1, 2007

(30) Foreign Application Priority Data

Apr. 28, 2006 (JP) ............................. 2006-125778

(51) Int. Cl.
*G06F 12/14* (2006.01)
(52) U.S. Cl. ...................... 711/163; 711/115; 711/164; 711/165; 726/28
(58) Field of Classification Search ................. 711/115, 711/163, 164, 165; 358/1, 16, 1.18; 713/165, 713/167, 183, 189, 193; 726/28
See application file for complete search history.

(56) References Cited

U.S. PATENT DOCUMENTS

| | | | |
|---|---|---|---|
| 2006/0083479 A1 | 4/2006 | Iwasaki et al. | |
| 2006/0184806 A1* | 8/2006 | Luttmann et al. | ........... 713/193 |
| 2007/0255949 A1* | 11/2007 | Miyazaki et al. | ........... 713/165 |

FOREIGN PATENT DOCUMENTS

| | | | |
|---|---|---|---|
| JP | 4-054764 | A | 2/1992 |
| JP | 11-305968 | | 11/1999 |
| JP | 2004-094563 | | 3/2004 |
| JP | 2005-051321 | A | 2/2005 |
| JP | 2005-103867 | | 4/2005 |
| JP | 2006-060484 | A | 3/2006 |
| JP | 2006-115195 | A | 4/2006 |
| JP | 2006092115 | A * | 4/2006 |
| JP | 2007098850 | A * | 4/2007 |

OTHER PUBLICATIONS

JP Office Action dtd Jun. 3, 2008, JP Appln. 2006-125778 (partial translation).

* cited by examiner

*Primary Examiner*—Jack A Lane
(74) *Attorney, Agent, or Firm*—Banner & Witcoff, Ltd.

(57) ABSTRACT

An image reading apparatus includes: a reading unit; a memory interface unit; a permission information obtaining unit; a permission determining unit; and a data recording unit. The reading unit reads an image. An external memory is removably connected to the memory interface unit and stores permission information. The permission information obtaining unit is configured to obtain the permission information from the external memory. The permission determining unit is configured to determine whether the obtained permission information is valid. The data recording unit is configured to record data corresponding to the image on the external memory connected to the memory interface unit if the obtained permission information is valid.

16 Claims, 18 Drawing Sheets

FIG. 14A

| MFP NODE NAME | AUTHENTICATION DATA |
|---|---|
| MFP_01 | AAAAAAAA |
| MFP_02 | BBBBBBBB |
| MFP_03 | CCCCCCCC |
| MFP_04 | DDDDDDDD |
| MFP_05 | EEEEEEEE |
| MFP_06 | FFFFFFFF |
| MFP_07 | GGGGGGGG |
| MFP_08 | HHHHHHHH |
| MFP_09 | IIIIIIII |
| MFP_10 | JJJJJJJJ |
| MFP_11 | kkkkkkkk |

← RECORD
← RECORD

FIG. 14B

| MFP NODE NAME | AUTHENTICATION DATA GENERATED FLAG | AUTHENTICATION DATA UPDATE FLAG | AUTHENTICATION DATA UPDATE SUCCESS FLAG | AUTHENTICATION DATA |
|---|---|---|---|---|
| MFP_01 | ON | OFF | ON | AAAAAAAA |
| MFP_02 | ON | OFF | ON | BBBBBBBB |
| MFP_03 | ON | OFF | ON | CCCCCCCC |
| MFP_04 | ON | OFF | ON | DDDDDDDD |
| MFP_05 | ON | OFF | ON | EEEEEEEE |
| MFP_06 | ON | OFF | ON | FFFFFFFF |
| MFP_07 | ON | ON | OFF | GGGGGGGG |
| MFP_08 | ON | OFF | ON | HHHHHHHH |
| MFP_09 | ON | OFF | ON | IIIIIIII |
| MFP_10 | ON | OFF | ON | JJJJJJJJ |
| MFP_11 | ON | ON | OFF | kkkkkkkk |
| MFP_12 | OFF | OFF | OFF | 00000000 |
| MFP_13 | OFF | OFF | OFF | 00000000 |

} NEW MFP

IMAGE READING APPARATUS, HOST APPARATUS AND IMAGE READING SYSTEM

CROSS-REFERENCE TO RELATED APPLICATIONS

This application is based upon and claims the benefit of priority from Japanese Patent Application No. 2006-125778, filed on Apr. 28, 2006, the entire contents of which are incorporated herein by reference.

TECHNICAL FIELD

The present invention relates to an image reading apparatus that reads an image. More particularly, the present invention relates to: an image reading apparatus capable of recording data corresponding to images read by the apparatus on an external memory; a host apparatus connected to the image reading apparatus; and an image reading system including the image reading apparatus and the host apparatus.

BACKGROUND

There is an image reading apparatus includes: a reading unit that reads an image; an interface unit to which an external memory can be removably connected; and a data recording unit that records data corresponding to the image read by the reading unit on the external memory connected to the interface unit. In this type of image reading apparatus, an image can be read by the reading unit, and data corresponding to the image can be recorded on the external memory connected to the interface unit. Additionally, JP-A-2005-0103867 discloses an image reading apparatus that requires an operator to input a password when image formation is again performed according to data recorded on the external memory.

However, if once data corresponding to images, such as images of a confidential document, are recorded on a portable external memory, such as a USB memory, incase where the portable external memory is leaked out, there is a fear that the data will be decoded in some manner even though the data are protected by a password as described above.

A possible measure is to require an operator to input a password so that only an authorized person can record data corresponding to images on an external memory when the data are recorded thereon. However, the operator who knows the password can record the data on as many external memories as he likes. In this case, there arises a fear that a great flood of external memories storing data corresponding to the images will be produced, and these external memories cannot be fully managed so as not to leak out the data thereof.

SUMMARY

According to a first aspect of the invention, there is provided an image reading apparatus including: a reading unit that reads an image; a memory interface unit to which an external memory is removably connected, the external memory that stores permission information; a permission information obtaining unit configured to obtain the permission information from the external memory; a permission determining unit configured to determine whether the obtained permission information is valid; and a data recording unit configured to record data corresponding to the image on the external memory connected to the memory interface unit if the obtained permission information is valid.

According to a second aspect of the invention, there is provided a host apparatus including: a first memory interface unit to which an external memory is removably connected; a permission information recording unit configured to record permission information on the external memory connected to the first memory interface unit; a first communication interface unit connectable to an image reading apparatus that includes a reading unit that reads an image, a second memory interface unit to which the external memory is removably connected, a permission information obtaining unit configured to obtain the permission information from the external memory connected to the second memory interface unit, a permission determining unit configured to collate the obtained permission information with recording permission information and determine whether the obtained permission information is valid based on a collation result, and a data recording unit configured to record data corresponding to the image on the external memory connected to the second memory interface unit if the obtained permission information is valid; and a recording permission information transmitting unit configured to transmit the recording permission information to the image reading apparatus through the first communication interface unit.

According to a third aspect of the invention, there is provided a host apparatus including: a first memory interface unit to which an external memory is removably connected; a permission information recording unit configured to record permission information on the external memory connected to the first memory interface unit; a first communication interface unit connectable to an image reading apparatus that includes a reading unit that reads an image, a second memory interface unit to which the external memory is removably connected, a permission information obtaining unit configured to obtain the permission information from the external memory connected to the second memory interface unit, a permission determining unit configured to transmit the obtained permission information to the host apparatus and receive a collation result from the host apparatus and determine whether the obtained permission information is valid based on the collation result, and a data recording unit configured to record data corresponding to the image on the external memory connected to the second memory interface unit if the obtained permission information is valid; a recording permission information storing unit that stores recording permission information; a collating unit configured to collate the obtained permission information transmitted from the image reading apparatus and the recording permission information; and a collation result transmitting unit configured to transmit the collation result obtained by the collating unit to the image reading apparatus.

According to a fourth aspect of the invention, there is provided an image reading system including a host apparatus and an image reading apparatus capable of communicating with the host apparatus, wherein the host apparatus includes: a first memory interface unit to which an external memory is removably connected; a permission information recording unit configured to record the permission information on the external memory connected to the first interface unit; and a recording permission information transmitting unit configured to transmit recording permission information to the image reading apparatus, and wherein the image reading apparatus includes: a reading unit that reads an image; a second memory interface unit to which the external memory is removably connected; a permission information obtaining unit configured to obtain the permission information from the external memory connected to the second memory interface unit; a permission determining unit configured to collate the obtained permission information with the recording permission information and determine whether the obtained permission information is valid based on a collation result; and a data recording unit configured to record data corresponding to the image on the external memory connected to the second memory interface unit if the obtained permission information is valid.

According to a fifth aspect of the invention, there is provided an image reading system including a host apparatus and an image reading apparatus capable of communicating with the host apparatus, wherein the host apparatus includes: a first memory interface unit to which an external memory is removably connected; a permission information recording unit configured to record permission information on the external memory connected to the first memory interface unit; a recording permission information storing unit that stores recording permission information; a collating unit configured to collate obtained permission information obtained by and transmitted from the image reading apparatus and recording permission information; and a collation result transmitting unit configured to transmit the collation result obtained by the collating unit to the image reading apparatus, and wherein the image reading apparatus includes: a reading unit that reads an image; a second memory interface unit to which the external memory is removably connected; a permission information obtaining unit configured to obtain the permission information from the external memory connected to the second memory interface unit; a permission determining unit configured to: transmit the obtained permission information to the host apparatus and receive the collation result from the host apparatus; and determine whether the obtained permission information is valid based on the collation result; and a data recording unit configured to record data corresponding to the image on the external memory connected to the second memory interface unit if the obtained permission information is valid.

BRIEF DESCRIPTION OF THE DRAWINGS

FIG. 14A is an explanatory drawing showing an MFP authentication data table of the management PC;

FIG. 14B is an explanatory drawing showing a USB supported MFP list;

DESCRIPTION

Figure 1:
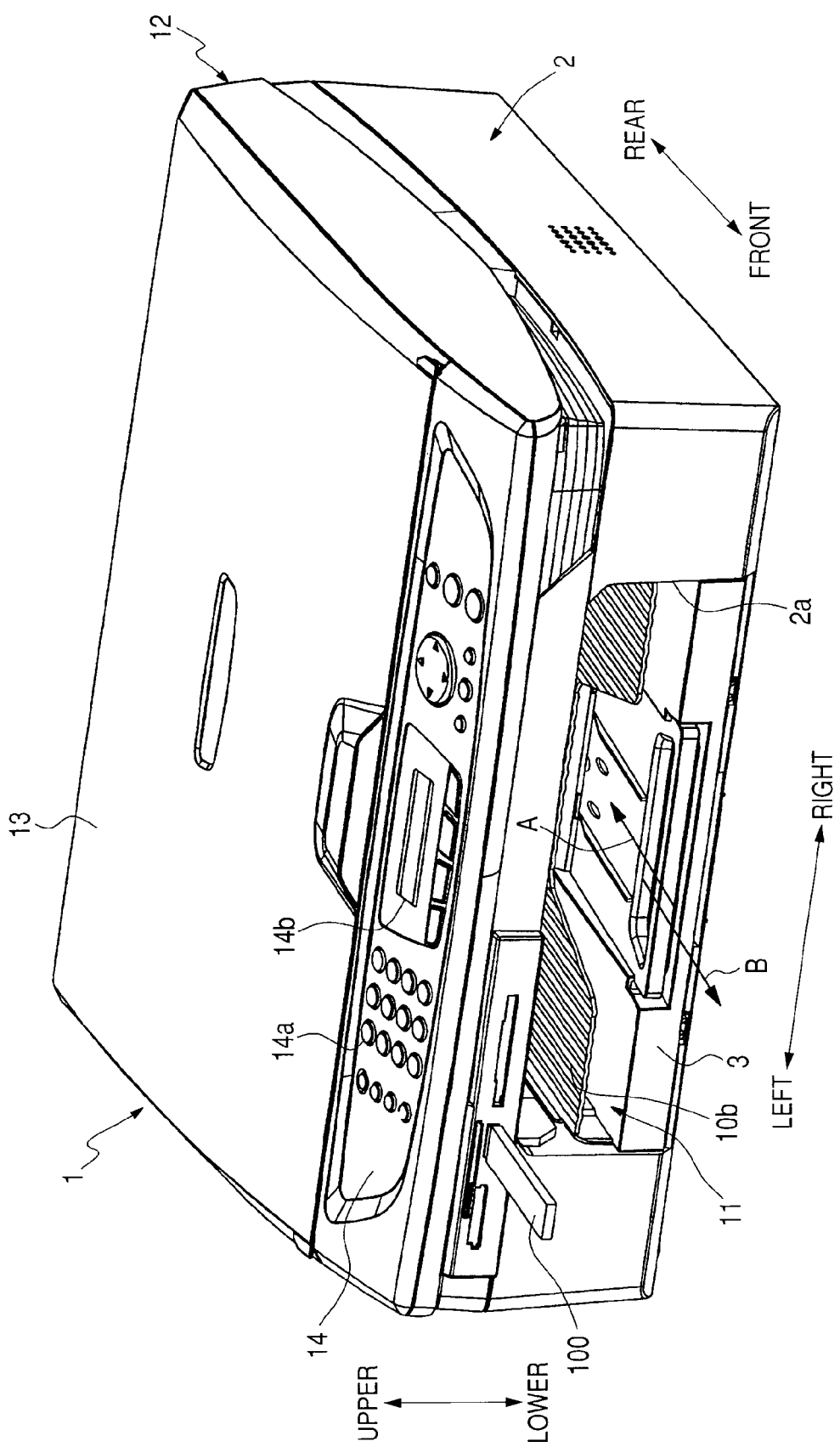
FIG. 1 is a perspective view showing the structure of an MFP to which the present invention is applied.
Figure 2:
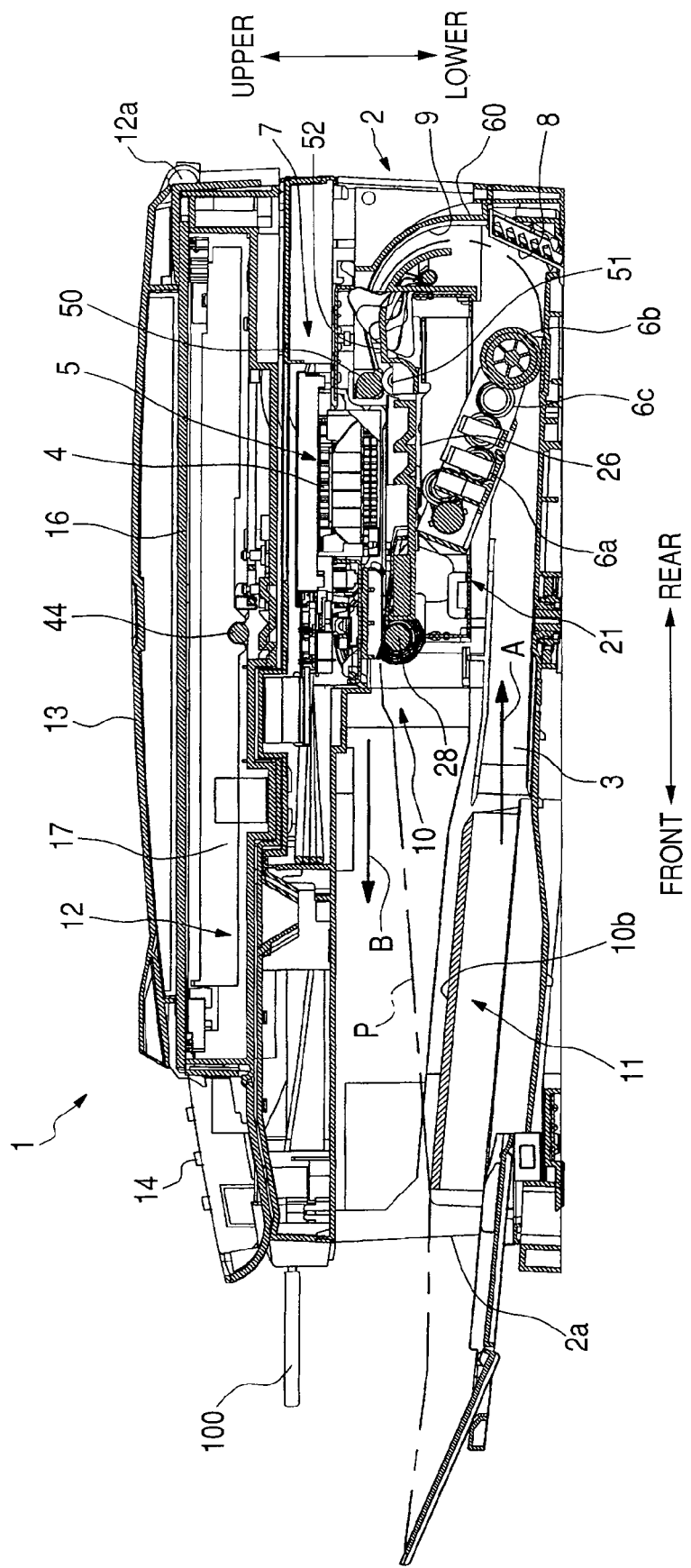
FIG. 2 is a sectional side view showing the structure of the MFP.

Next, embodiments of the present invention will be described with reference to the attached drawings. FIG. 1 is a perspective view of a multi function printer (hereinafter, referred to as "MFP") 1 taken as an example of the image reading apparatus of the present invention; and FIG. 2 is a sectional side view of the MFP 1.

(Description of the Mechanical Structure of the MFP 1)

The MFP 1 has a plurality of functions such as a printer function, a copy function, a scanner function and a facsimile function. As shown in FIGS. 1 and 2, the MFP 1 includes an image reading apparatus 12 disposed at the upper part of a housing 2 made of a synthetic resin, which is used to read an image, such as an image recorded on a sheet of a document.

The image reading apparatus 12 can be pivoted on a pivot shaft (not shown) disposed at the left end thereof so as to be upwardly opened or downwardly closed with respect to the housing 2. Further, a document covering lid 13 is provided to cover the upper surface of the image reading apparatus 12 and capable of being pivoted on a pivot shaft 12a (see FIG. 2) disposed at the rear end of the document covering lid 13 so as to be upwardly opened or downwardly closed with respect to the image reading apparatus 12.

As shown in FIG. 2, a glass plate 16 is disposed on the upper surface of the image reading apparatus 12, so that a document to be read is placed on the glass plate 16 with the document covering lid 13 opened. An image scanner (CIS: a contact image sensor) 17, which is an example of a reading unit that reads an image, is disposed below the glass plate 16 such that the image scanner 17 can be reciprocated along a guide shaft 44 extending in directions perpendicular to the sheet surface of FIG. 2 (i.e., rightward and leftward directions).

Further, as shown in FIGS. 1 and 2, an operation panel 14 is disposed at the forward part of the image reading apparatus 12, and the operation panel 14 includes a group of operating buttons 14a for receiving manual operations and a liquid crystal display (LCD) 14b that displays various information. The group of operating buttons 14a may include an arrow key, an execution key, a cancel key, numerical keypad, etc.

A paper feed unit 11 is disposed at the bottom of the housing 2, and the paper feed unit 11 feeds sheets of recording paper P used as a printing medium. The paper feed unit 11 includes a paper feed cassette 3 that stores sheets of recording paper P in a stacked state. The paper feed cassette 3 is removably mounted on the paper feed unit 11 through an opening 2a formed in the forward part of the housing 2 in forward and backward directions with respect to the housing 2.

As shown in FIG. 2, an inclined separating plate 8 is disposed at the rear side of the paper feed cassette 3 to be used to separate sheets of recording paper from each other. The inclined separating plate 8 is shaped to have a convex curve in a planar view such that the plate 8 protrudes at a portion meeting to the center in the width direction (i.e., in rightward and leftward directions) of a sheet of recording paper P and is descended toward both the right and left ends in the width direction of the sheet of recording paper P. An elastic separating pad of a saw-toothed shape is disposed to meet the center in the width direction of the sheet of recording paper P and to come into contact with the front edge of the sheet of recording paper P in order to facilitate the paper separation.

In the paper feed unit 11, the proximal end of a paper feed arm 6a used to feed sheets of recording paper P from the paper feed cassette 3 is attached to the side of the housing 2 so as to be rotatable upwardly and downwardly. A rotational driving force is transmitted from an LF motor (i.e., line feed motor) 131 (see FIG. 6) to a paper feed roller 6b disposed at the distal end of the paper feed arm 6a by means of a gear transmission mechanism 6c disposed in the paper feed arm 6a. Sheets of recording paper P stacked in the paper feed cassette 3 are separated and conveyed one by one by means of both the paper feed roller 6b and the elastic separating pad of the inclined separating plate 8. The sheets of recording paper P separated from each other in this manner so as to proceed in a paper feed direction (i.e., direction of arrow A) are conveyed to an printing unit 7 disposed above the paper feed cassette 3 through a feed path 9 including a transverse-U-shaped path formed in a gap between a first conveying path 60 and a second conveying path 52.

Figure 3:
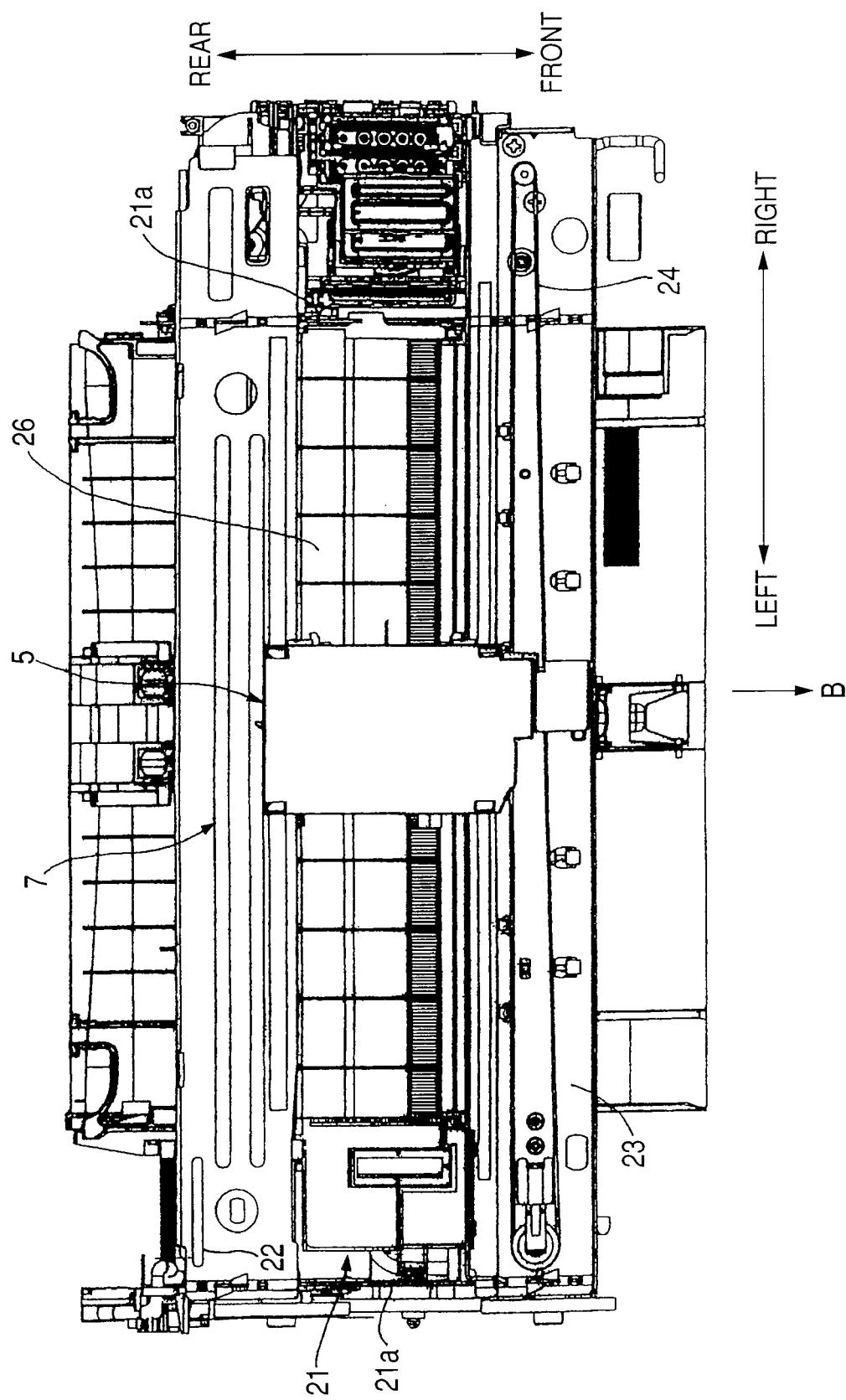
FIG. 3 is a plan view showing the internal structure of the MFP, in which an image reading apparatus is not shown.

FIG. 3 is a plan view showing the internal structure of the MFP 1, in which the image reading apparatus 12 is not shown. As shown in FIG. 3, the printing unit 7 includes a main frame 21 having a box shape and including an upwardly-directed opening and first guide member 22 and second guide member 23. Each of the first guide member 22 and the second guide member 23 has a horizontally-long plate shape, is supported by a pair of right and left side plates 21a and extends in rightward and leftward directions (i.e., main scanning direction). The printing unit 7 also includes: an inkjet print head 4 (see FIG. 2 and FIG. 4) that forms an image on the recording paper P by jetting ink from the lower surface thereof; and a carriage 5 on which the print head 4 is mounted disposed between the first guide member 22 and the second guide member 23.

The carriage 5 is slidably supported by and extending between the first guide member 22 disposed on the upstream side of the paper flow in a paper discharging direction (i.e., direction of arrow B) and the second guide member 23 disposed on the downstream side thereof, and the carriage 5 is capable of reciprocating in rightward and leftward directions. In order to reciprocate the carriage 5, a timing belt 24 is wound around the upper surface of the second guide member 23 disposed on the downstream side of the paper flow in the paper discharging direction and to extend in the main scanning direction (i.e., rightward and leftward directions). A CR (carriage) motor 132 (see FIG. 6) that drives the timing belt 24 is fixed to the lower surface of the second guide member 23.

In the printing unit 7, a flat platen 26 that faces the print head 4 and that extends in rightward and leftward directions is fixed to the main frame 21 between the guide members 22 and 23 under the print head 4 of the carriage 5.

As shown in FIG. 2, the MFP 1 includes: a driving roller 50 that conveys the recording paper P to the lower surface of the print head 4; and a nip roller 51 that is located under the driving roller 50 while facing the driving roller 50, which are disposed on the upstream side of the paper flow in the paper discharging direction (i.e., direction of arrow B) of the platen 26. The MFP 1 also includes: a paper discharging roller 28 that conveys the recording paper P that has passed through the printing unit 7 to a paper discharging unit 10 in the paper discharging direction (i.e., direction of arrow B); and a spur roller (not shown) that faces the paper discharging roller 28 and is urged toward the paper discharging roller 28, which are disposed on the downstream side of the paper flow in the paper discharging direction (i.e., direction of arrow B) of the platen 26.

The recording paper P having been subjected to a printing operation in the printing unit 7 is discharged while upwardly directing the recorded surface of the recording paper P from the paper discharging unit 10. The paper discharging unit is disposed above the paper feed unit 11 and is formed as a part common to the opening 2a formed in the forward part of the housing 2. The sheets of recording paper P discharged from the paper discharging unit 10 in the paper discharging direction (i.e., direction of arrow B) are stacked together and stored in a paper receiving tray 10b located on the inner side than the opening 2a.

An ink storing unit (not shown) is disposed at the right end of the forward part of the housing 2 covered with the image reading apparatus 12. Four ink cartridges that respectively contain four kinds of color ink, i.e., black (Bk) ink, cyan (C) ink, yellow (Y) ink and magenta (M) ink, which are used for full-color recording, are removably attached to the ink storing unit in a state of upwardly opening the image reading apparatus 12. These ink cartridges are connected to the print head 4 through four flexible ink supply tubes. The ink stored in each ink cartridge is supplied to the print head 4 through each ink supply tube.

Figure 4:
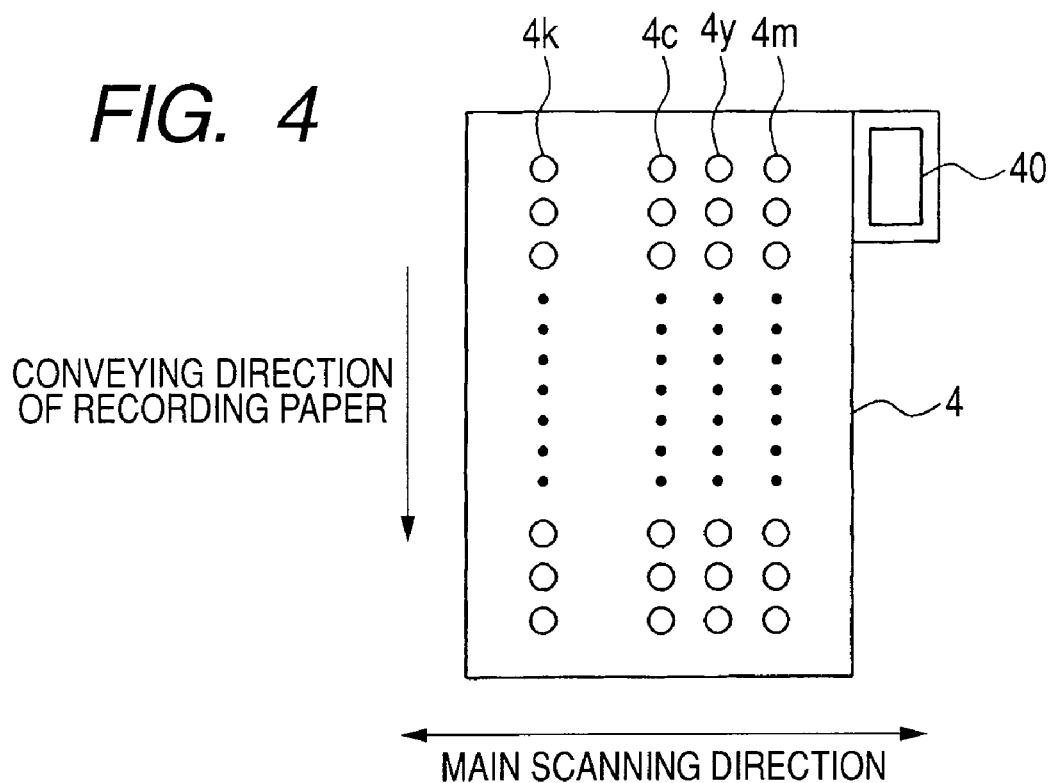
FIG. 4 is a schematic view of a print head of the MFP viewed from below.

FIG. 4 is a schematic view of the print head 4 viewed from below. As shown in FIG. 4, the print head 4 includes nozzle lines 4k, 4c, 4y and 4m, each has a plurality of nozzles arranged in a conveying direction (i.e., paper discharging direction, or sub-scanning direction) of the recording paper P. In more detail, four nozzle lines 4k, 4c, 4y and 4m each of which discharges each individual color ink are arranged side by side in accordance with four kinds of color ink, i.e., black (Bk) ink, cyan (C) ink, yellow (Y) ink and magenta (M) ink that are used for full-color recording.

The print head 4 is provided with a media sensor 40 that can detect an edge in the width direction (i.e., rightward and leftward directions) of the recording paper P (i.e., an edge of the recording paper P parallel to the conveying direction). The media sensor 40 may be an optical sensor (reflection type sensor) including a light emitting element (e.g., a light emitting diode) and a light receiving element (e.g., a phototransistor) and detects the presence of the recording paper P lying under the media sensor 40 by receiving a beam of reflected light generated by emitting the light emitting element.

Figure 5:
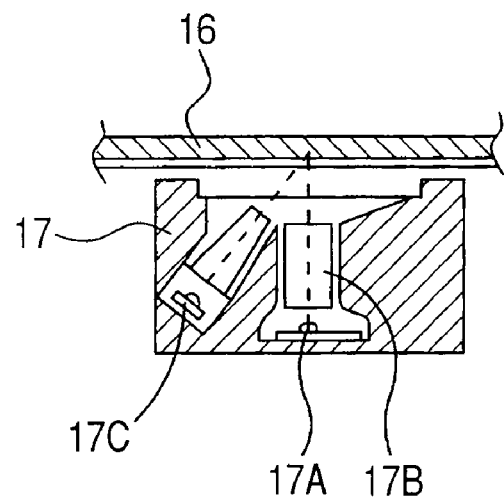
FIG. 5 is a cross-sectional view showing the internal structure of an image scanner of the MFP.

Next, FIG. 5 is a cross-sectional view showing the internal structure of the image scanner 17. As shown in FIG. 5, the image scanner 17 includes an image device 17A, a SELFOC lens 17B and a light source 17C. In the image scanner 17, light is projected from the light source 17C toward a document placed on the glass plate 16, thereafter light reflected from the document is imaged on the image device 17A by means of the SELFOC lens 17B, and the resulting image is read by the image device 17A.

(Description of a Control System of the MFP 1)

Figure 6:
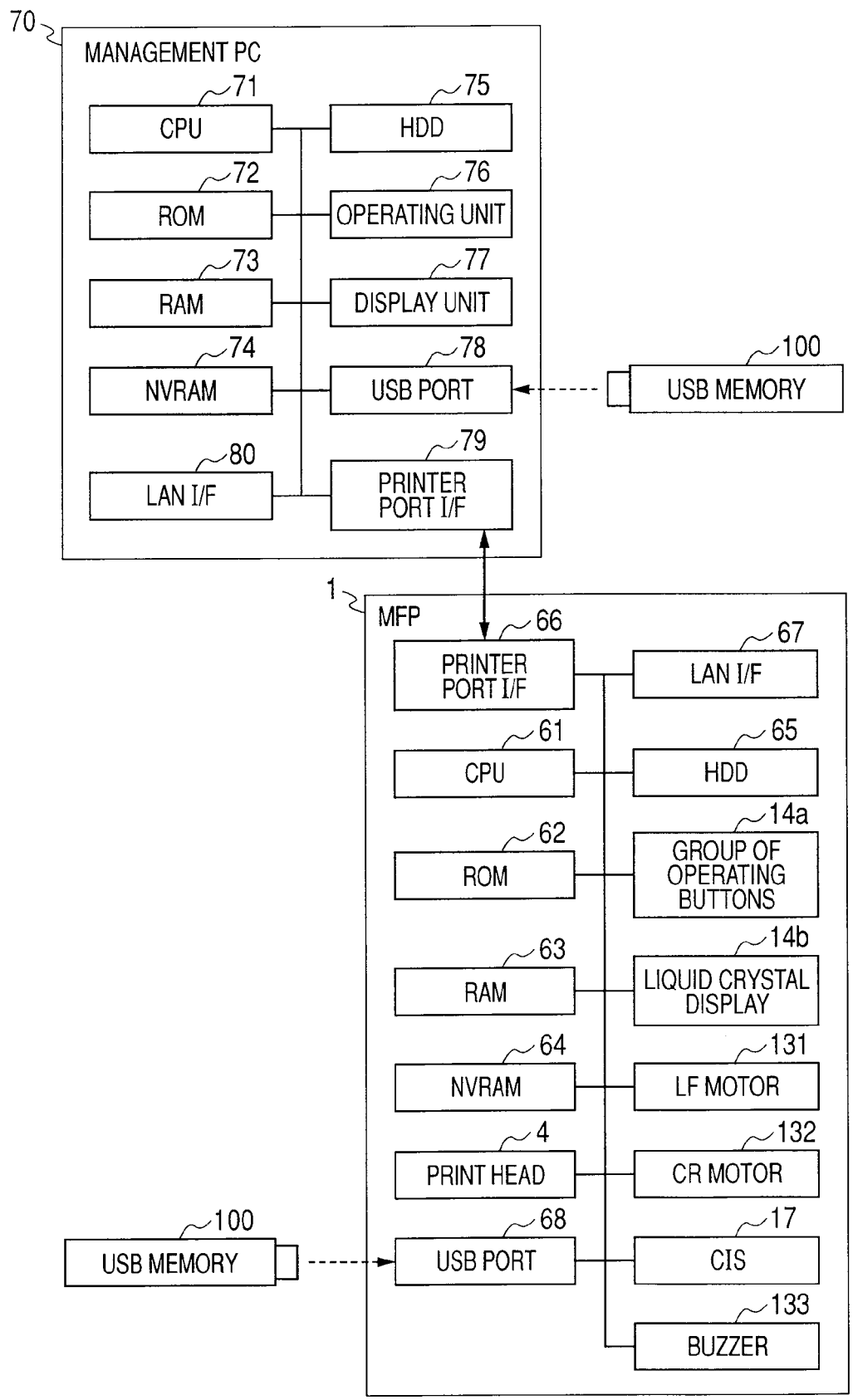
FIG. 6 is a block diagram showing the structure of the MFP and the structure of a control system of a management PC.

Next, a control system of the MFP 1 will be described with reference to the block diagram of FIG. 6. As shown in FIG. 6, the MFP 1 includes: a CPU (central processing unit) 61 that performs various calculations; a ROM (read-only memory) 62 that stores, for example, a control program; and a RAM (random-access memory) 63 that temporarily stores various data.

An NVRAM (non-volatile RAM) 64 in which data stored herein is not deleted even if a power supply switch is turned off and a hard disk drive (HDD) 65 are connected to the CPU 61. Further, the CPU 61 is connected to: a printer port interface (printer port I/F) 66 used to make a connection with a personal computer for management (hereinafter, referred to as "management PC") 70 that serves as an example of a host apparatus; a LAN interface (LAN I/F) 67 used to make a connection with a LAN (Local Area Network: not shown); a USB port 68 serving as an example of an interface unit to which a USB memory 100 (see FIG. 13) serving as an example of an external memory is removably connected; the group of operating buttons 14a; the liquid crystal display 14b; the image scanner (CIS) 17; the LF motor 131; the CR motor 132; a buzzer 133 that emits an error sound.

Likewise, the management PC 70 includes a CPU 71, a ROM 72, a RAM 73 and an NVRAM 74. The CPU 71 is connected to: a hard disk drive (HDD) 75; an operating unit 76 such as a keyboard and a mouse; a display unit 77 such as a CRT; a USB port 78 serving as an example of an interface unit to which a USB memory 100 is removably connected; a printer port interface (printer port I/F) 79 used to make a connection with the MFP 1; and a LAN interface (LAN I/F) 80 used to make a connection with a LAN (not shown). Although the single MFP 1 is connected to the single management PC 70 in FIG. 6, a plurality of MFPs 1 can be connected to the single management PC 70 in this embodiment. In this case, all, some or one of MFPs 1 may be connected to the management PC 70 through the LAN interfaces 67 and 80.

(Description of a Management Application)

In the MFP 1 according to this embodiment, when a specific USB memory 100 described later (which is also called an "authentication USB memory") is connected to the USB port 68, data of an image read via the image scanner 17 as described above can be recorded on the authentication USB memory. Therefore, at first, a description will be given of a management application executed by the management PC 70 in order to manage the authentication USB memory. FIGS. 7 to 12 are flowcharts showing the processes of the management application.

Figure 7:
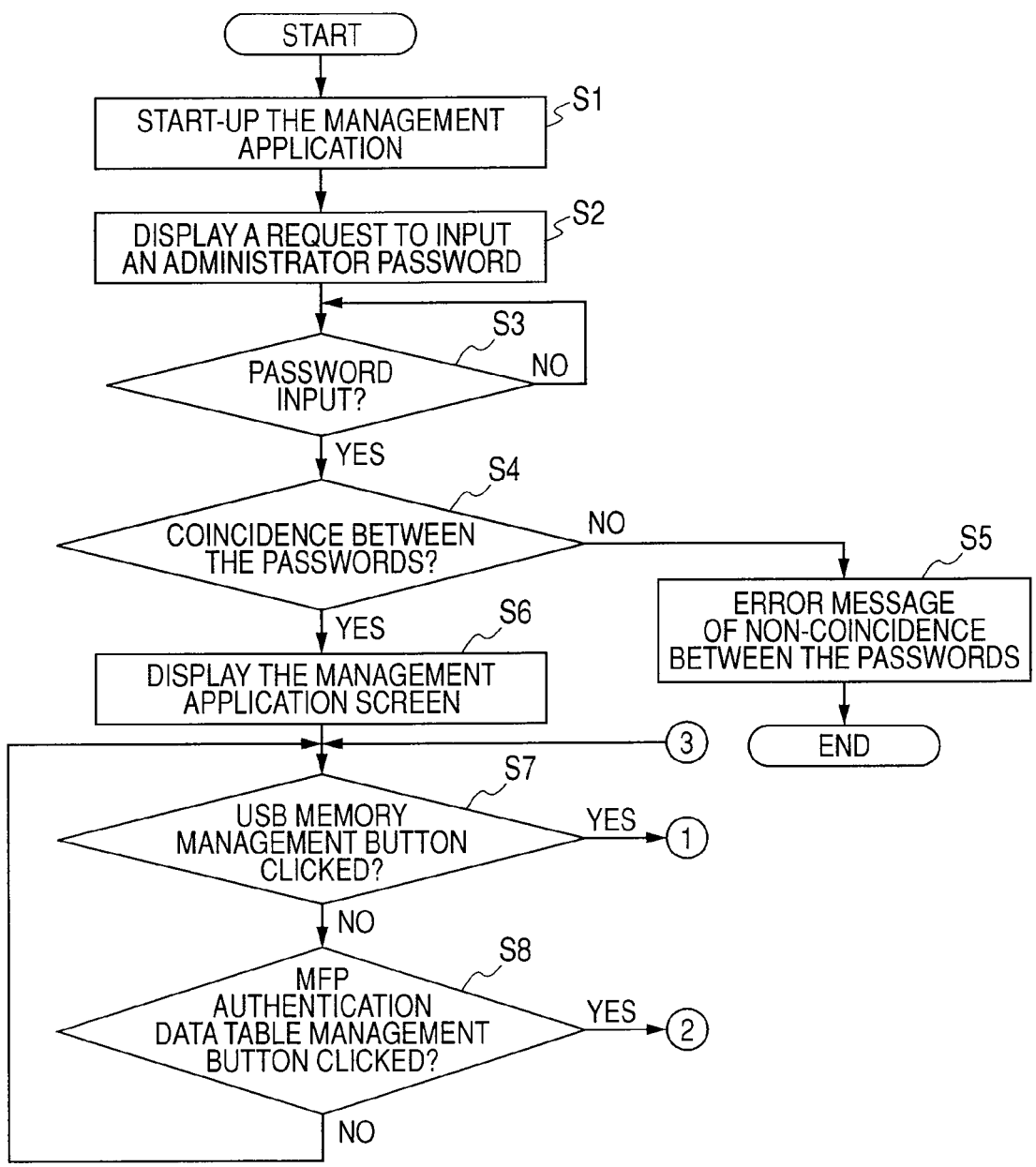
FIG. 7 is a flowchart showing the process of a management application in the management PC.
Figure 8:
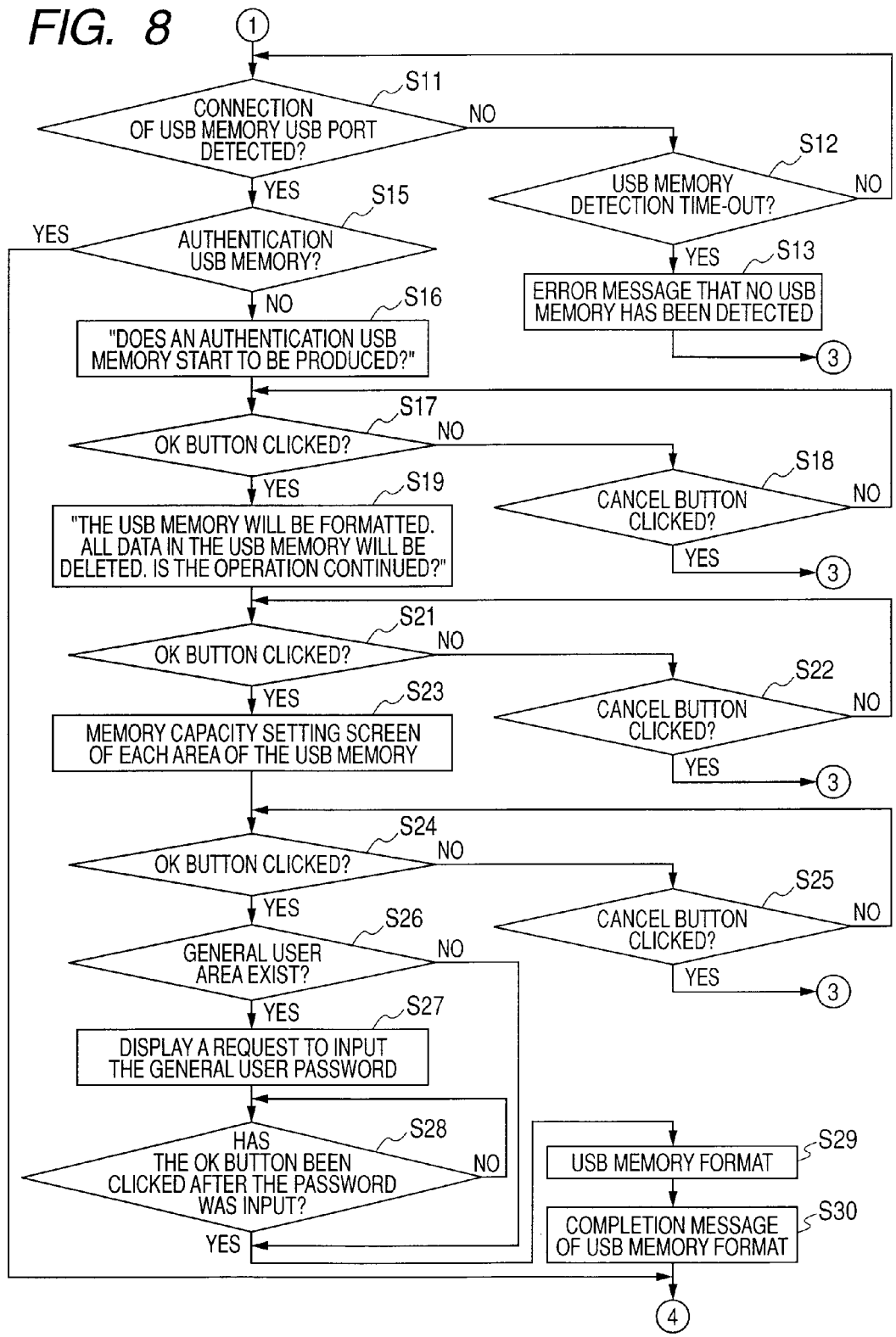
FIG. 8 is a flowchart showing steps subsequent to the process of the management application.
Figure 9:
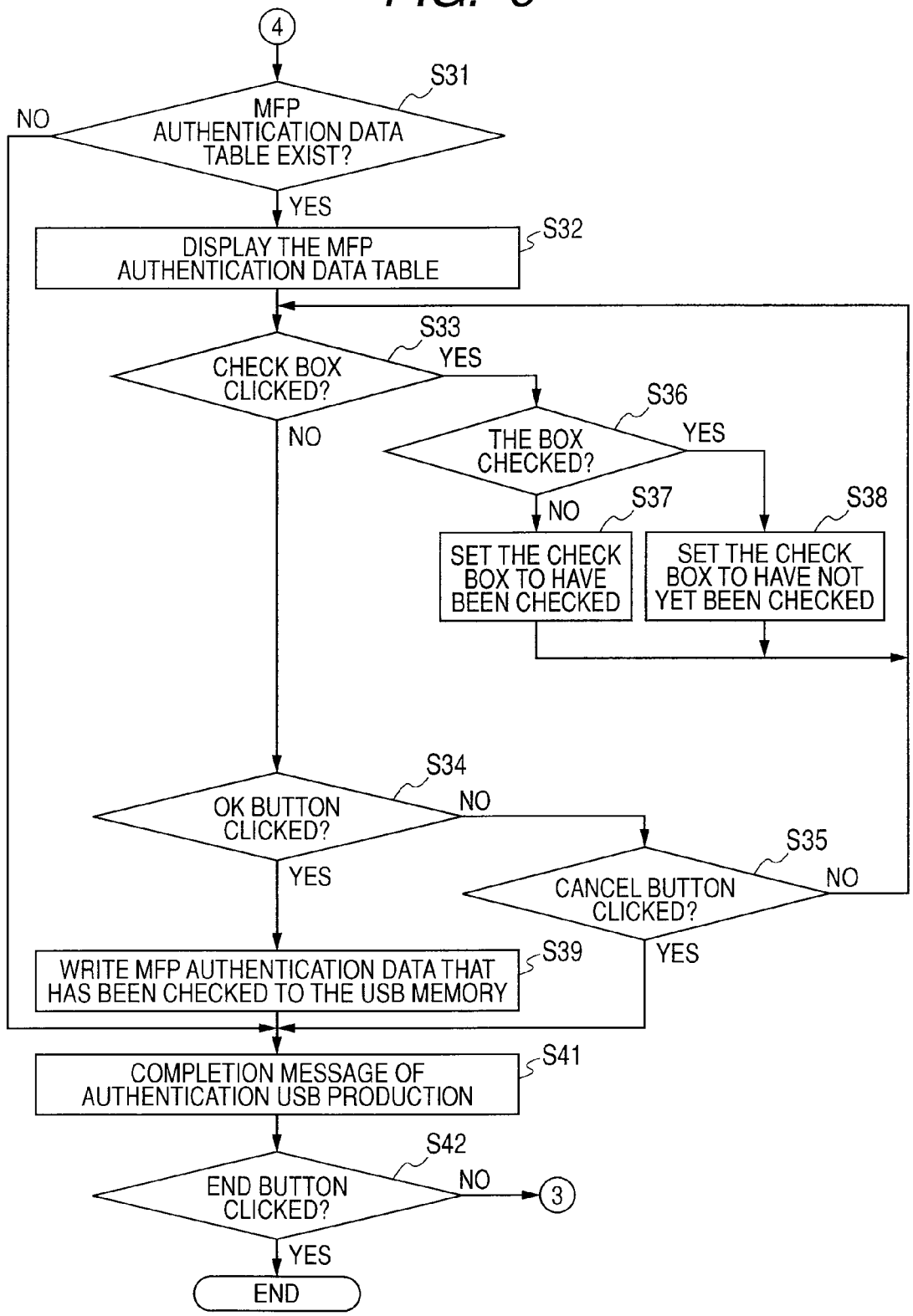
FIG. 9 is a flowchart showing steps further subsequent to the process of the management application.
Figure 10:
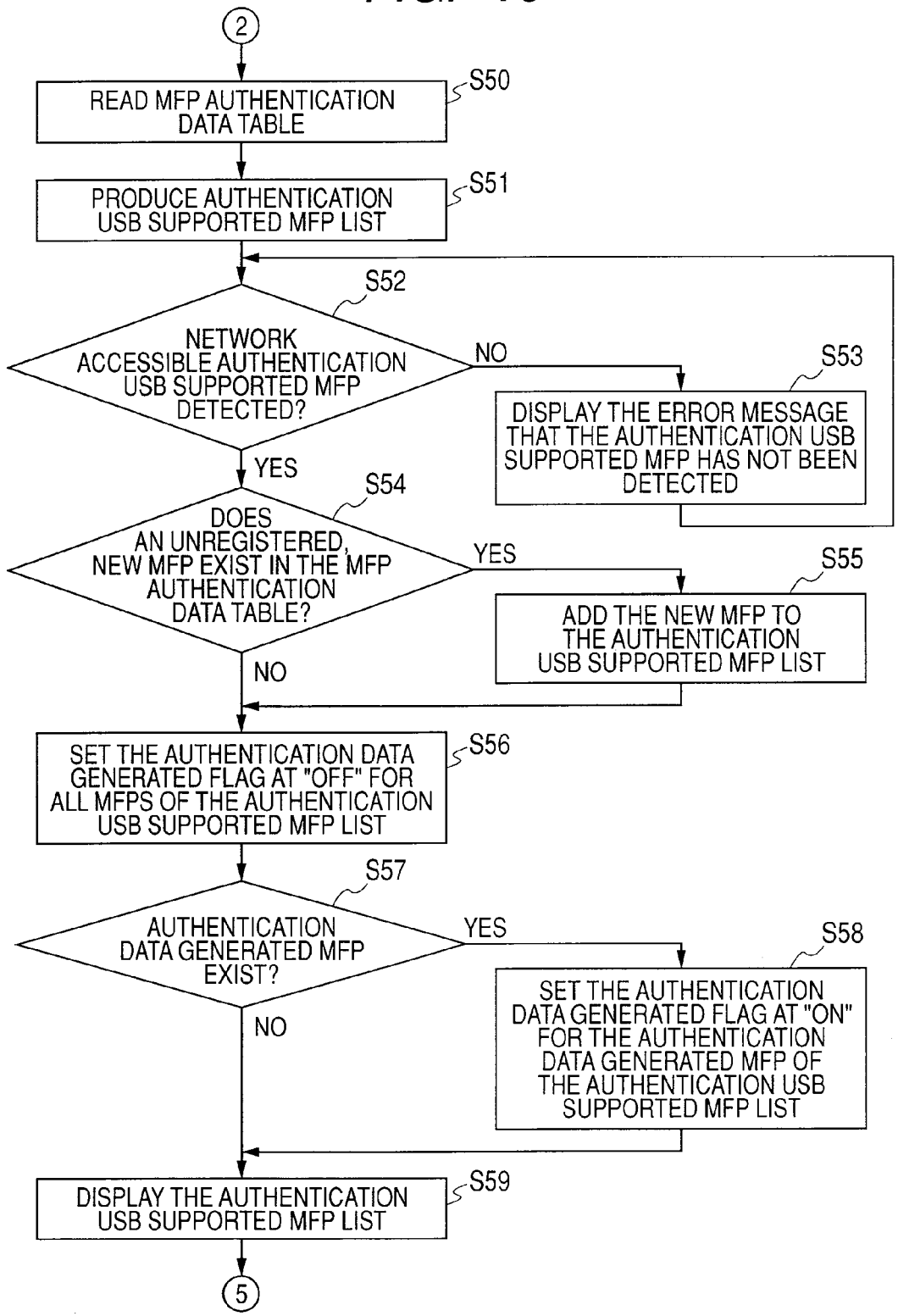
FIG. 10 is a flowchart showing steps still further subsequent to the process of the management application.
Figure 11:
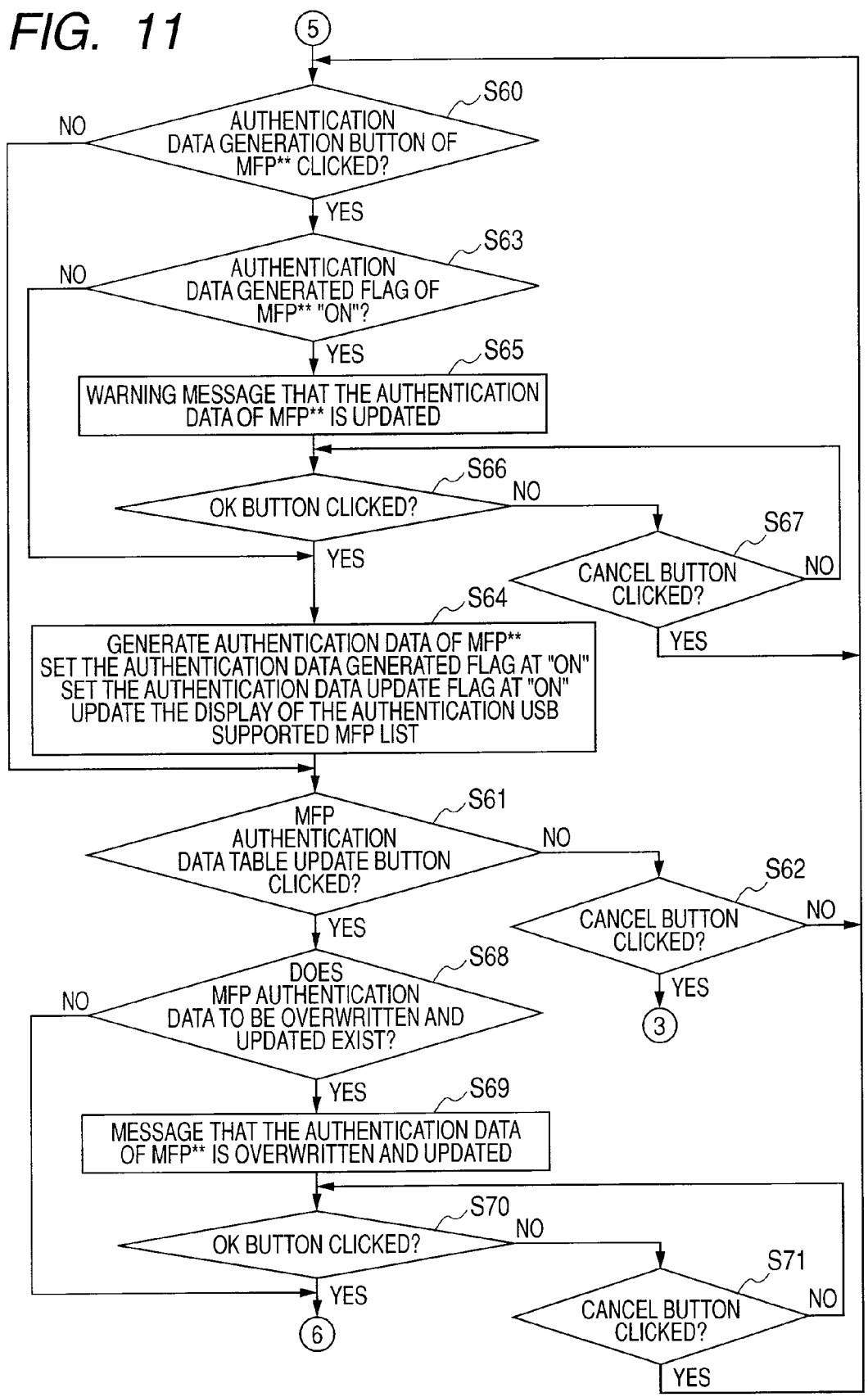
FIG. 11 is a flowchart showing steps still further subsequent to the process of the management application.
Figure 12:
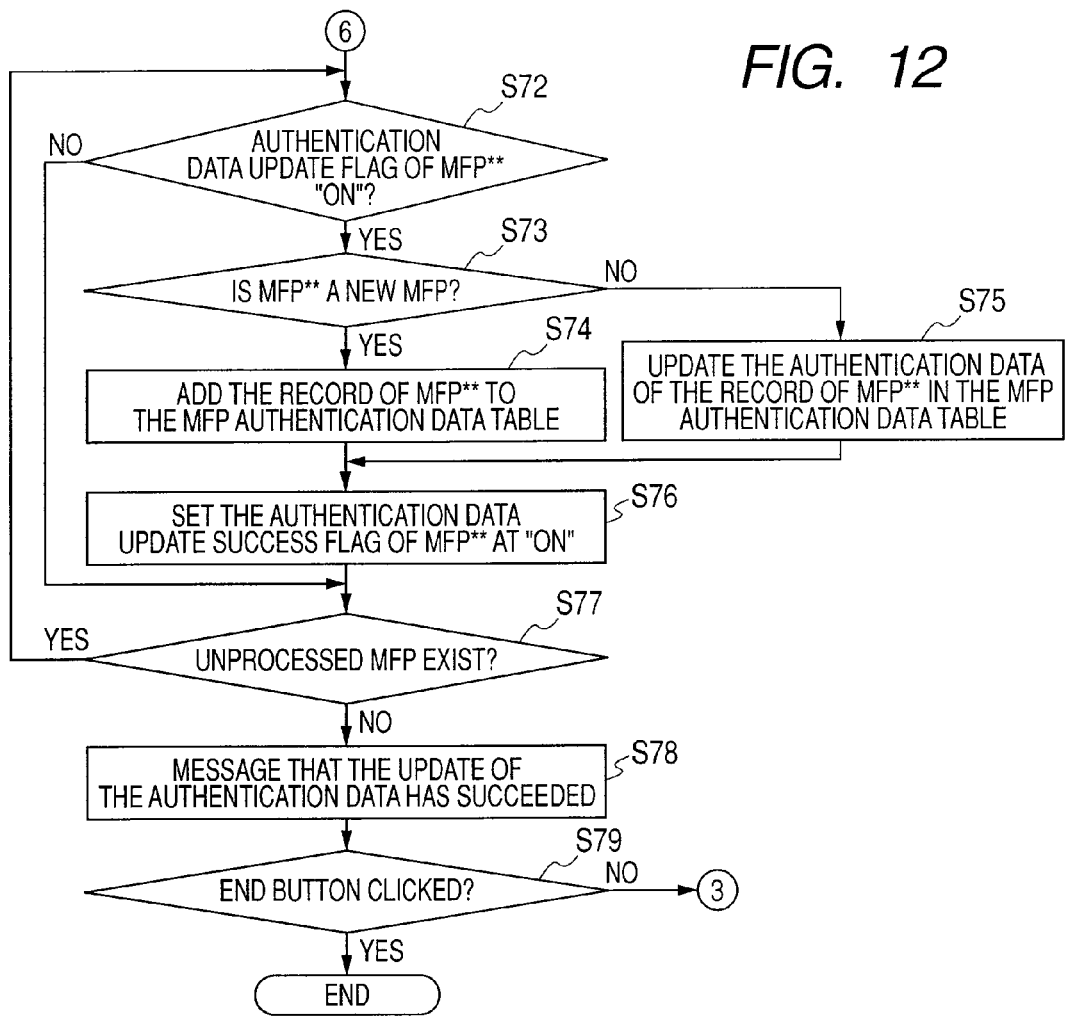
FIG. 12 is a flowchart showing steps still further subsequent to the process of the management application.

When the power source of the management PC 70 is turned on, the process shown in FIG. 7 is started. First, the CPU 71 starts a management application at step S1. Thereafter, at step S2, a request to input an administrator password is displayed by showing a dialog on the display unit 77. Then, a waiting state lasts until the password is input through the operating unit 76 at step S3 (S3: N). If the password is input (S3: Y), the CPU 71 determines whether this password coincides with a preset password stored in the NVRAM 74 at step S4.

If no coincidence occurs between the passwords (S4: N), an error message to inform that the passwords do not coincide with each other is displayed on the display unit 77, and the process is completed. If a coincidence occurs between the passwords (S4: Y), the process proceeds to step S6, where a management application screen having a USB memory management button, an MFP authentication data table management button, etc., is displayed on the display unit 77.

Thereafter, the CPU 71 determines whether the USB memory management button has been clicked and whether the MFP authentication data table management button has been clicked at steps S7 and S8, respectively. If both of the buttons have not been clicked (S7: N, S8: N), the process returns to step S7 to make these determinations again.

If the USB memory management button is clicked in a waiting state during the loop operation of steps S7 and S8 (S7: Y), the process proceeds to step S11. At step S11, the CPU 71 determines whether the valid USB memory 100 has been detected at the USB port 78 (i.e., whether the USB memory 100 has been connected to the USB port 78). If the valid USB memory 100 is not detected (S11: N), the process proceeds to step S12 and the CPU 71 determines whether a predetermined USB memory detection time has reached a time-out. If not (S12: N), the process returns to step S11 and the process of steps S11 and S12 are repeatedly performed. If the USB memory detection time reaches the time-out without the detection of the valid USB memory at the USB port 78 (S12: Y), an error message to inform that the USB memory has not been detected is displayed at step S13, and the process proceeds to steps S7 and S8 performing the loop operation.

Note that, if the USB memory management button is clicked, a user will insert the USB memory 100, which is intended to be an authentication USB memory, into the USB port 78 before or after the clicking operation in most cases. Therefore, normally, an affirmative determination is made at step S11 before reaching the time-out, and the process proceeds to step S15.

At step S15, the CPU 71 determines whether the USB memory 100 connected to the USB port 78 is an authentication USB memory. If the USB memory 100 connected thereto is a new one, a negative determination is made (S15: N). Thereafter, at step S16, a message that "Does an authentication USB memory start to be produced?" is displayed on the display unit 77 together with an OK button and a cancel button. Thereafter, the CPU 71 determines whether the OK button has been clicked at step S17. If not (S17: N), the CPU 71 determines whether the cancel button has been clicked at step S18. If the cancel button is also not clicked (S18: N), the process again returns to step S17, and a waiting state lasts until the OK button or the cancel button is clicked by the loop operation of steps S17 and S18. If the cancel button is clicked during this loop operation, the process proceeds to steps S7 and S8 performing a loop operation. If the OK button is clicked, the process proceeds to step S19.

At step S19, a message that "The USB memory will be formatted. All data stored in the USB memory will be deleted. Is the operation continued?" is displayed on the display unit 77 together with the OK button and the cancel button. Thereafter, at steps S21 and S22, a waiting state lasts until the OK button or the cancel button is clicked by the similar loop operation as at steps S17 and S18. If the cancel button is clicked during this loop operation (S22: Y), the process proceeds to steps S7 and S8 performing a loop operation. If the OK button is clicked (S21: Y), the process proceeds to step S23.

Figure 13:
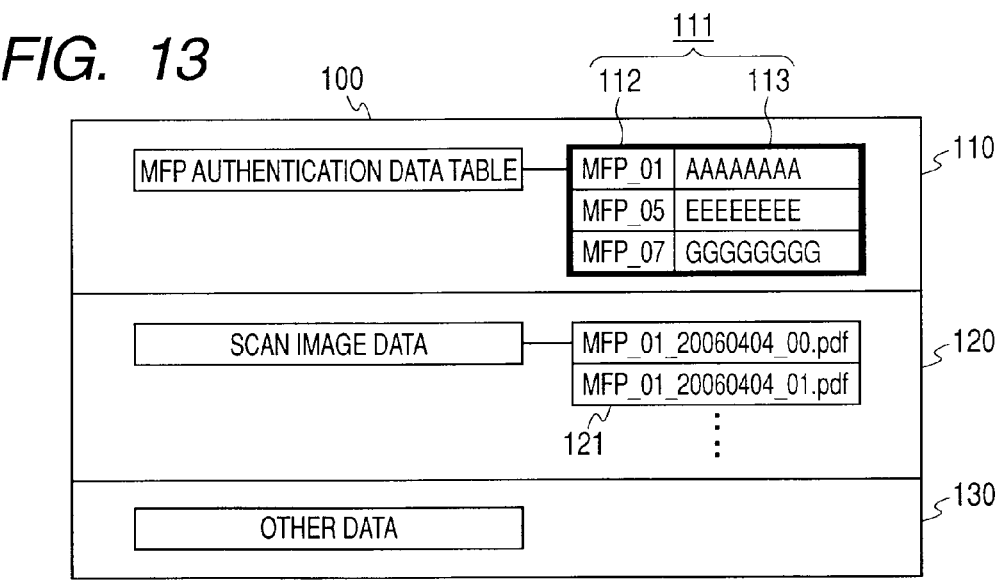
FIG. 13 is an explanatory drawing showing the format of a storage area of a USB memory.

At step S23, a memory capacity setting screen for each area of the USB memory 100 is displayed on the display unit 77 together with the OK button and the cancel button. In more detail, as shown in FIG. 13, an authentication USB memory produced through this process has its storage area divided into an administrator area 110, a general user area 120 and an unprotected area 130. An MFP authentication data table 111 is recorded on the administrator area 110. The MFP authentication data table 111 includes: MFP node names 112 each of which is an example of individual information showing individual of MFP 1 in which the USB memory 100 can be used as an authentication USB memory; and authentication data 113 that is an example of permission information associated with the MFP node names. The MFP node name is also stored in the NVRAM 64 of the MFP 1. The MFP node name 112 and the authentication data 113 thereof serve as a pair. Scan image data 121 corresponding to an image read via the image scanner 17 is recorded on the general user area 120. Other general items of data are recorded on the unprotected area 130, which are not protected by, for example, a password. The administrator area 110 has a fixed capacity. However, in the general user area 120 and the unprotected area 130, a user can set their capacities. For example, their capacities can be set by numeric keys input on the memory capacity setting screen displayed at step S23.

Referring back to FIG. 8, when the memory capacity setting screen is displayed at step S23, in most cases, a desired numerical value is input and then the OK button is clicked. Thereafter, at steps S24 and S25, a waiting state lasts until the OK button or the cancel button is clicked by the similar loop operation as at steps S17 and S18. If the cancel button is clicked during this loop operation (S25: Y), the process proceeds to steps S7 and S8 performing a loop operation. If the OK button is clicked (S24: Y), the process proceeds to step S26.

Based on the capacity set above, the CUP 71 determines whether the general user area 120 exists at step S26. If the general user area 120 exists (S26: Y), a general user password input request to input a password for the general user area 120 is displayed on the display unit 77. Thereafter, at step S28, a waiting state lasts until the password is input and until the OK button is clicked (S28: N). If the password is input, and then the OK button is clicked (S28: Y), the process proceeds to step S29, and a USB memory formatting process to format the USB memory 100 is executed based on the set capacity and the password. When the USB memory formatting process is completed, a message to inform the USB memory has been completely formatted is displayed on the display unit 77 at step S30. The process then proceeds to step S31. If the authentication USB memory is connected to the USB port 78 (S15: Y) when the USB memory management button is clicked (S7: Y), the steps S16 to S30 are skipped because the USB memory 100 has already been completely formatted, and hence the process proceeds directly to step S31.

At step S31, the CPU 71 determines whether the MFP authentication data table has been stored in the NVRAM 74 of the management PC 70. As shown in FIG. 14A, the MFP authentication data table includes MFP node names of the MFP 1 and authentication data that is an example of recording permission information associated with the MFP node names, in which each node name and authentication data thereof serve as a pair, in the similar manner as the MFP authentication data table 111 recorded on the USB memory 100. This MFP authentication data table is a table produced when the MPF authentication data table management button is clicked (S8: Y), and a process for producing the table will be described in detail later. If the MFP authentication data table exists (S31: Y), the process proceeds to step S32 and the MFP authentication data table is displayed on the display unit 77 while being accompanied by a check box placed on the immediate left side of each MFP node name.

Thereafter, the CPU 71 determines whether the check box has been clicked at step S33. If not (S33: N), the CPU 71 determines whether the OK button has been clicked at step S34. If the OK box is also not clicked (S34: N), the CPU 71 determines whether the cancel button has been clicked at step S35. If not (S34: N), the process proceeds to step S33. Accordingly, a waiting state lasts until any one of the check box, the OK button and the cancel button is clicked by the loop operation of steps S33 to S35.

If the check box is clicked during this loop operation (S33: Y), the CPU 71 determines whether the check box has been checked at step S36. If the check box has not been checked (S36: N), the check box is set to be checked at step S37. If the check box has been checked (S36: Y), the check box is set to have not yet been checked at step S38, and the process proceeds to steps S33 to S35 performing a loop operation.

If the OK button is clicked during the loop operation of steps S33 to S35 (S34: Y), the authentication data of the MFP 1 corresponding to the check box having been checked is written to the administrator area 110 of the USB memory 100 in the form of the MFP authentication data table 111 at step S39. If the authentication USB memory is connected to the USB port 78 (S15: Y) when the USB memory management button is clicked (S7: Y), the MFP authentication data table is displayed in a state where the check box corresponding to the MFP 1 that has already been registered in the MFP authentication data table 111 is previously checked (S32). If the check box is changed into unchecking one (S38), the authentication data 113 of the MFP 1 thereof is deleted at step S39.

A message to inform the production of an authentication USB has been completed is displayed on the display unit 77 at step S41 subsequent to step S39. Thereafter, the CPU 71 determines whether an end button has been clicked within a predetermined time after the message is displayed thereon at step S42. If the end button is clicked (S42: Y), the process reaches the end without executing any other steps. If the end button is not clicked (S42: N), the process proceeds to steps S7 and S8 performing a loop operation as mentioned above.

If the MFP authentication data table itself has not been stored in the NVRAM 74 of the management PC 70 (S31: N), the process skips over steps S32 to S39 and proceeds directly to step S41, and then a message to inform the production of the authentication USB has been completed is displayed. Likewise, if the cancel button is clicked during the loop operation of steps S33 to S35, the process proceeds directly to step S41 without writing the authentication data to the USB memory 100 (S39).

If the MFP authentication data management button is clicked (S8: Y) under a waiting state during the loop operation of steps S7 and S8, the process proceeds to step S50, and an MFP authentication data table stored in the NVRAM 74 of the management PC 70 at that time is read. Thereafter, based on this MFP authentication data table, an MFP list associated with an authentication USB shown in FIG. 14B is produced in a predetermined area of the RAM 73 at step S51.

As shown in FIG. 14B, the authentication USB supported MFP list includes not only MFP node names and authentication data, both of which serve as a pair in the similar manner as the MFP authentication data table, but also an authentication data generated flag, an authentication data update flag and an authentication data update success flag, which are set for each of the MFPs 1. This authentication USB supported MFP list is formed so that a new MFP 1 can be added. "00000000," which serves as authentication data, is provisionally set for the new MFP 1 that has not yet been registered in the MFP authentication data table. In FIG. 14B, authentication data "kkkkkkkk" is generated for "MFP_11" that is a new MFP 1 at step S64 described later, whereas no authentication data is generated for "MFP_12" and "MFP_13."

Thereafter, the CPU 71 determines whether an authentication USB supported MFP (i.e., an MFP 1 that supports an authentication USB) that is accessible through a network has been detected at step S52. If the authentication USB supported MFP has been detected (S53: Y), the process proceeds to step S54. If not (S52: N), an error message to inform that the authentication USB supported MFP has not yet been detected is displayed on the display unit 77 at step S53, and then the process again proceeds to step S52. If the authentication USB supported MFP is connected to a network during the loop operation of steps S52 and S53, an affirmative determination is made at step S52, and the process proceeds to step S54.

At step S54, the CPU 71 determines whether a new MFP 1 that has not yet been registered in the MFP authentication data table exists for authentication USB supported MFPs having been detected above. If a new MFP 1 exists (S54: Y), this new MFP 1 is added to the authentication USB supported MFP list at step S55, and the process proceeds to step S56. If a new MFP 1 does not exist (S54: N), the process proceeds directly to step S56. The authentication data generated flag corresponding to all MFPs 1 of the authentication USB supported MFP list is set at "OFF" at step S56.

Thereafter, at step S57, the CPU 71 determines whether an authentication data generated MFP 1 (i.e., the MFP 1 with the authentication data having been generated) exists for MFPs 1 listed in the authentication USB supported MFP list. If an authentication data generated MFP 1 exists (S57: Y), the authentication data generated flag corresponding to the authentication data generated MFP 1 in the authentication USB supported MFP list is set at "ON" at step S58, and the process proceeds to step S59. If an authentication data generated MFP 1 does not exist (S57: N), the process proceeds directly to step S59.

The authentication USB supported MFP list that reflects a flag setting state at that time is displayed on the display unit 77 at step S59. This authentication USB supported MFP list is displayed while being accompanied by an authentication data generation button with respect to each MFP 1 and while being accompanied by various buttons, such as an MFP authentication data table update button and a cancel button.

Thereafter, at step S60, the CPU 71 determines whether the authentication data generation button of any one of the MFPs 1 (hereinafter, referred to also as "MFP**") has been clicked. If not, the CPU 71 determines whether the MFP authentication data table update button has been clicked at step S61. If the MFP authentication data table update button has also not been clicked (S61: N), the CPU 71 determines whether the cancel button has been clicked at step S62. If not, the process proceeds to step S60. Accordingly, by the loop operation of steps S60 to S62, a waiting state lasts until any one of buttons is clicked as follows: the authentication data generation button of the MFP 1; the MFP authentication data table update button; and the cancel button.

If the cancel button is clicked during this loop operation (S62: Y), the process proceeds to steps S7 and S8 performing a loop operation mentioned above. If the authentication data generation button of any one of the MFPs 1 (i.e., MFP) is clicked during the loop operation of steps S60 to S62 (S60: Y), the CPU 71 determines whether the authentication data generated flag of MFP is in an "ON" state at step S63. If the authentication data generated flag of MFP is in an "OFF" state (S63: N), the process proceeds through step S64 to the loop operation of steps S60 to S62. At step S64, the authentication data of MFP is generated, and the authentication data generated flag and the authentication data update flag are set at "ON." The display of the authentication USB supported MFP list displayed on the display unit 77 is updated in the similar manner.

On the other hand, if the authentication data generated flag of MFP is in an "ON" state (S63: Y), there is a possibility that the authentication data will be changed when step S64 is executed. Therefore, in this case, a warning message to inform that the authentication data of MFP will be updated is displayed on the display unit 77 at step S65. Thereafter, at steps S66 and S67, a waiting state lasts until the OK button or the cancel button is clicked by the similar loop operation as at steps S17 and S18. If the cancel button is clicked during this loop operation (S67: Y), the process proceeds to steps S60 to S62 performing a loop operation mentioned above. If the OK button is clicked (S66: Y), the process proceeds to step S64 to newly generate authentication data.

Thereafter, if the MFP authentication data table update button is clicked during the loop operation of steps S60 to S62 (S61: Y), the CPU 71 determines whether there is MFP authentication data to be overwritten and updated at step S68. If there is MFP authentication data to be overwritten and updated (S68: Y), a message to inform that the authentication data of the MFP 1 (MFP**) will be overwritten and updated is displayed on the display unit 77 at step S69. Thereafter, at steps S70 and S71, a waiting state lasts until the OK button or the cancel button is clicked by the similar loop operation as at steps S17 and S18. If the cancel button is clicked during this loop operation (S71: Y), the process proceeds to steps S60 to S62 performing a loop operation. If the OK button is clicked (S70: Y), the process proceeds to step S72.

At steps S72 to S77, the following process is applied to each MFP 1 of the authentication USB supported MFP list temporarily produced by the above process. First, the CPU 71 determines whether the authentication data update flag of an MFP 1 (MFP) is in an "ON" state at step S72. If "ON" (S72: Y), the CPU 72 determines whether the MFP is a new MFP 1. If that is a new MFP 1 (S73: Y), a record of the MFP is added to a record (i.e., a pair of an MFP node name and authentication data) of the MFP authentication data table shown in FIG. 14A at step S74, and the process proceeds to step S76. If that is not a new MFP 1 (S73: N), the authentication data of the record of the MFP in the MFP authentication data table is updated (S75), and the process proceeds to step S76.

At step S76, the authentication data update success flag of the MFP is set at "ON". Thereafter, the CPU 71 determines whether there is an unprocessed MFP 1 for the MFPs 1 in authentication USB supported MFP list at step S77. If there is an unprocessed MFP 1 thereamong (S77: Y), the process proceeds to step S72, and the process of steps S72 to S76 mentioned above is applied to any one of the unprocessed MFPs 1. If the authentication data-update flag of the MFP referred to at step S72 is in an "OFF" state (S72: N), the process skips over steps S73 to S76 and proceeds directly to step S77, and then the CPU 71 determines whether there are other unprocessed MFPs 1.

If the process of steps S72 to S76 is completed with respect to all MFPs 1 in the authentication USB supported MFP list in this manner (S77: N), a message to inform that the update of the authentication data has succeeded is displayed on the display unit 77 at step S78. At this time, the authentication USB supported MFP list is deleted from the RAM 73.

Thereafter, at step S79, the CPU 71 determines whether the end button has been clicked within a predetermined time after the message is shown at step S78. If the end button has been clicked (S79: Y), the process directly reaches the end. If the end button has not been clicked (S79: N), the process proceeds to steps S7 and S8 performing a loop operation mentioned above. Thus, in the management PC 70, these steps make it possible to change the USB memory 100 into an authentication USB memory including the MFP authentication data table 111 as shown in FIG. 13, or make it possible to produce an MFP authentication data table in the NVRAM 74.

(Description of an Image Reading Process)

Figure 15:
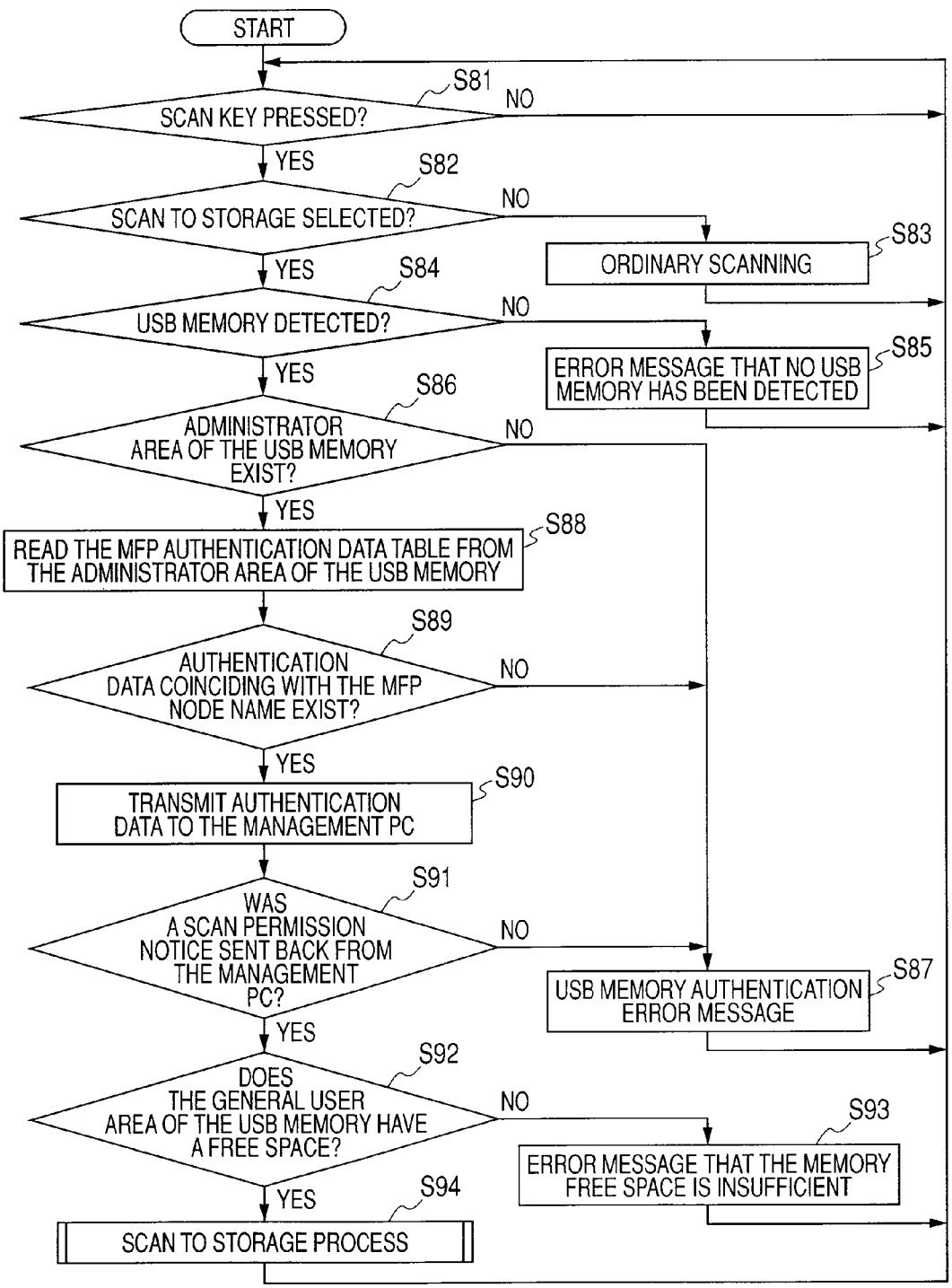
FIG. 15 is a flowchart showing an image reading process in the MFP.

Next, an image reading process executed by the MFP 1 will be described. When a power source is turned on, the CPU 61 of the MFP 1 executes an image reading process shown in FIG. 15. In this image reading process, at first, the CPU 61 determines whether a scan key of the group of operating buttons 14a has been pressed at step S81. The process waits until the scan key is pressed at step S81 (S81: N). If another key, such as a copy key, that indicates another function is pressed under this waiting state, another process corresponding to the function is executed.

If the scan key is pressed under the waiting state at step S81 (S81: Y), the process proceeds to step S82, and the CPU 61 determines whether a process for recording data on the USB memory 100 (which is called a "scan to storage" process) has been selected. If the scan to storage process has not been selected (S82: N), an ordinary scan process is executed at step S83, and the process proceeds to step S81.

On the other hand, if the scan to storage process has been selected (S82: Y), the CPU 61 determines whether the USB memory 100 has been detected at the USB port 68 at step S84. If the USB memory 100 has not been detected (S84: N), a buzzer 133 makes an error sound at step S85, and an error message to inform that the USB memory has not yet been detected is displayed on the liquid crystal display 14b. The process then proceeds to step S81 mentioned above.

If the USB memory 100 has been detected (S84: Y), the CPU 61 determines whether an administrator area 110 exists in the USB memory 100, i.e., whether the USB memory 100 is an authentication USB memory at step S86. If an administrator area 110 does not exist therein (S86: N), the buzzer 133 makes an error sound at step S87, and a USB authentication error message is displayed on the liquid crystal display 14b. The process then proceeds to step S81 mentioned above.

On the other hand, if an administrator area 110 exists in the USB memory 100 (S86: Y), the MFP authentication data table 111 is read from the administrator area 110 of the USB memory 100 at step S88. Thereafter, at step S89, the CPU 61 determines whether authentication data 113 that associated with the MFP node name 112 (e.g., "MFP_01") corresponding to the MFP node name stored in the NVRAM 64 exists in the MFP authentication data table 111. If not exist (S89: N), the process proceeds to step S87 mentioned above to inform an error message. On the other hand, if authentication data 113 that corresponds to the MFP node name 112 of own MFP 1 exists therein (S89: Y), the authentication data 113 is transmitted to the management PC 70 at step S90.

Figure 16:
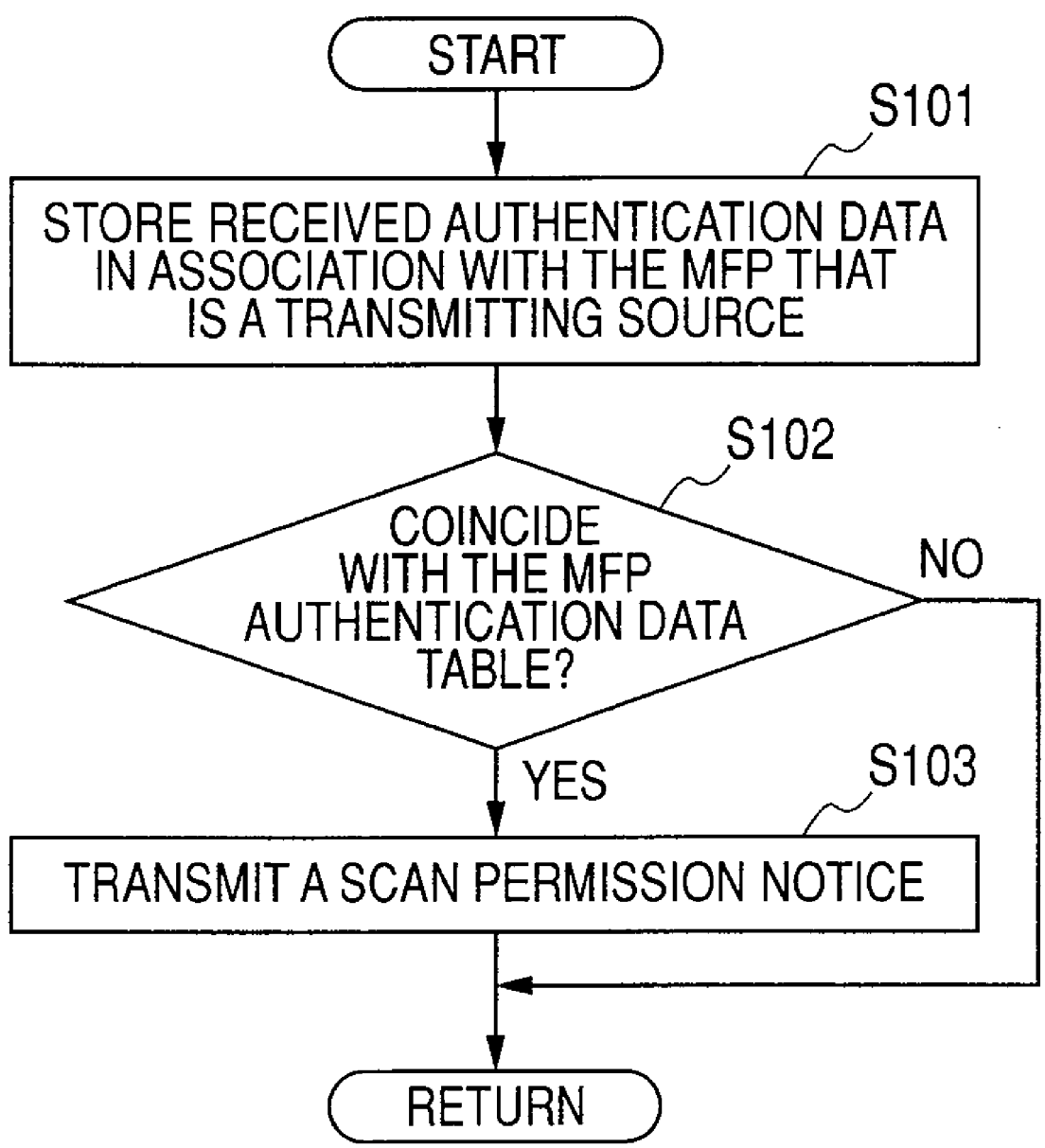
FIG. 16 is a flowchart showing an interrupt process of the management PC according to the image reading process.

When the authentication data is transmitted from the MFP 1, the management PC 70 is interrupted to execute the process of FIG. 16. In this process, at first, the authentication data received from MFP 1 is stored in the RAM 73 in association with the MFP node name of the MFP 1 of the transmitting source at step S101. Thereafter, at step S102, the CPU 71 determines whether the data pair including the authentication data and the MFP node name coincides with a pair of authentication data and an MFP node name recorded as a record in the MFP authentication data table. If the pairs coincide with each other (S102: Y), a scan permission notice is transmitted to the MFP 1 of the transmitting source at step S103, and the process of the management PC 70 returns to the process executed during the interruption. On the other hand, if the pair of the MFP node name and the authentication data does not coincide with that of the MFP authentication data table (S102: N), the process of the management PC 70 directly returns to the process having been executed before the interrupt.

Referring back to FIG. 15, in the MFP 1, the CPU 61 determines whether the scan permission notice has been sent back from the management PC 70 within a predetermined time at step S91 subsequent to step S90. If not (S91: N), the process proceeds to step S87 mentioned above to inform an error message. On the other hand, if the scan permission notice has been sent back from the management PC 70 (S91: Y), the CPU 61 determines whether the general user area 120 of the USB memory 100 has a free space at step S92. If the general user area 120 has no free space (S92: N), the buzzer 133 makes an error sound, and an error message to inform that the memory free space is insufficient is displayed on the liquid crystal display 14b. The process then proceeds to step S81 mentioned above.

On the other hand, if the general user area 120 of the USB memory 100 has a free space (S92: Y), a scan to storage process, through which data of an image read via the image scanner 17 is recorded on the USB memory 100, is executed at step S94. The process then proceeds to step S81 mentioned above.

Figure 17:
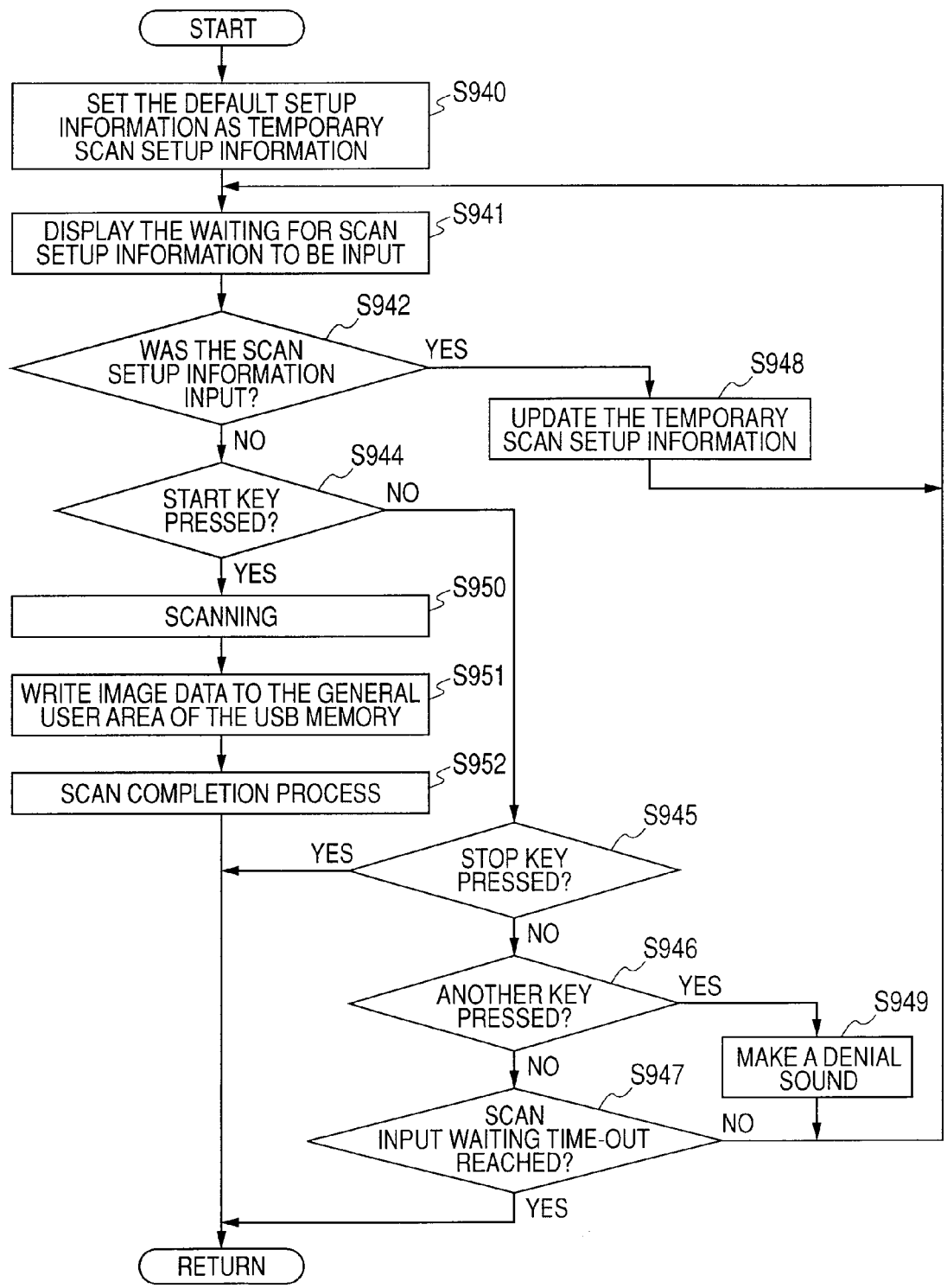
FIG. 17 is a flowchart showing scan to storage steps of the image reading process.

The scan to storage process will be described in detail with reference to the flowchart of FIG. 17. As shown in FIG. 17, in this process, default setup information is set as temporary scan setup information at step S940. Thereafter, at step S941, a scan setup information input waiting display, which indicates that a waiting state lasts until a user inputs scan setup information, is displayed on the liquid crystal display 14b. Thereafter, at step S942, the CPU 61 determines whether the user has input scan setup information. If the user has not input scan setup information (S942: N), the CPU 61 determines whether a start key has been pressed at step S944. If the start key has not been pressed, the CPU 61 determines whether a stop key has been pressed at step S945.

If the stop key is also not pressed (S945: N), the CPU 61 determines whether still another key has been pressed at step S946. If not, the CPU 61 determines whether a scan input waiting time out has elapsed at step S947. If the scan input waiting time out has not elapsed (S947: N), the process proceeds to step S941 mentioned above. In other words, by the loop operation of steps S941 to S947, a waiting state lasts until any key is pressed (S944: Y, or S945: Y, or S946: Y), or until the scan input waiting time out elapses (S947: Y), with the scan setup input display being performed (S941).

If scan setup information is input during this loop operation (S942: Y), temporary scan setup information is updated in accordance with its input at step S948, and the process again proceeds to steps S941 to S947 performing a loop operation. If the stop key is pressed during this loop operation (S945: Y), and if the scan input waiting time out elapses (S947: Y), the process proceeds to step S81 mentioned above without scanning. If any one of the other keys is pressed (S946: Y), the buzzer 133 makes a denial sound at step S949, and the process again proceeds to steps S941 to S947 performing a loop operation.

If the start key is pressed during this loop operation (S944: Y), the process proceeds to step S950. A scan operation for reading an image through the image scanner 17 is performed at step S950. Thereafter, at step S951, the image data read by the process of step S950 is written to the general user area 120 of the USB memory 100 as scan image data 121. Thereafter, a scan end operation is performed at step S952. For example, the image data that has been read by the process of step S950 and that has been temporarily stored in the RAM 63 is deleted. The process then proceeds to step S81 mentioned above.

As described above, in this embodiment, the scan to storage process (S94) is applied only to the USB memory 100 on which valid authentication data is recorded (see steps S89 to S91). Therefore, advantageously, the USB memory 100, on which data of images read via the image scanner 17 is recorded, can be prevented from being increased in number so as to produce a great flood of USB memories. Additionally, in this embodiment, authentication data read from the USB memory 100 is transmitted to the management PC 70 (S90), and a scan permission notice is received from the management PC 70 (S91: Y), thereby determining that the authentication data is valid. Therefore, a judgment of whether the authentication data is valid or not can be made on-line, and hence, for example, the storage area of a memory provided on the side of the MFP 1 can be saved more effectively than a case where a judgment of whether the authentication data is valid or not is made off-line by the MFP 1.

Additionally, in this embodiment, if authentication data that coincides with an MFP node name of a relevant MFP 1 does not exist in the USB memory 100 (S89: N), the authentication data of the USB memory 100 is determined to be invalid at that time, and further determination (e.g., transmission of the authentication data to the management PC 70) is not performed. Further, when the USB memory 100 is not connected (S84: N), the authentication data is not even read. Therefore, the process can be performed excellently swiftly.

Further, in this embodiment, authentication data 113 to be written to the USB memory 100 are collectively managed by the management PC 70. Therefore, the USB memory 100, on which data corresponding to images read via the image scanner 17 is recorded, can be more suitably prevented from being increased in number so as to produce a great flood of USB memories. Moreover, an authentication USB memory, to which the authentication data 113 mentioned above is written, includes its storage area divided into an administrator area 110, a general user area 120 and an unprotected area 130. Therefore, data can be read and written more smoothly. Still further, since the unprotected area 130 is provided, the USB memory 100 formatted as an authentication USB memory can be used in the similar manner as a general USB memory 100.

In the embodiment, the process of step S951 corresponds to an example of functions of a data recording unit, the process of step S88 corresponds to an example of functions of an permission information obtaining unit, the process of steps S89 to S91 corresponds to an example of functions of a permission determining unit, the process of step S84 corresponds to an example of functions of a memory detecting unit, the process of step S39 corresponds to an example of functions of a permission information recording unit, the process of step S102 corresponds to an example of functions of a collating unit, and the process of step S103 corresponds to an example of functions of a collation result transmitting unit, respectively.

Other Embodiments of the Present Invention

Figure 18:
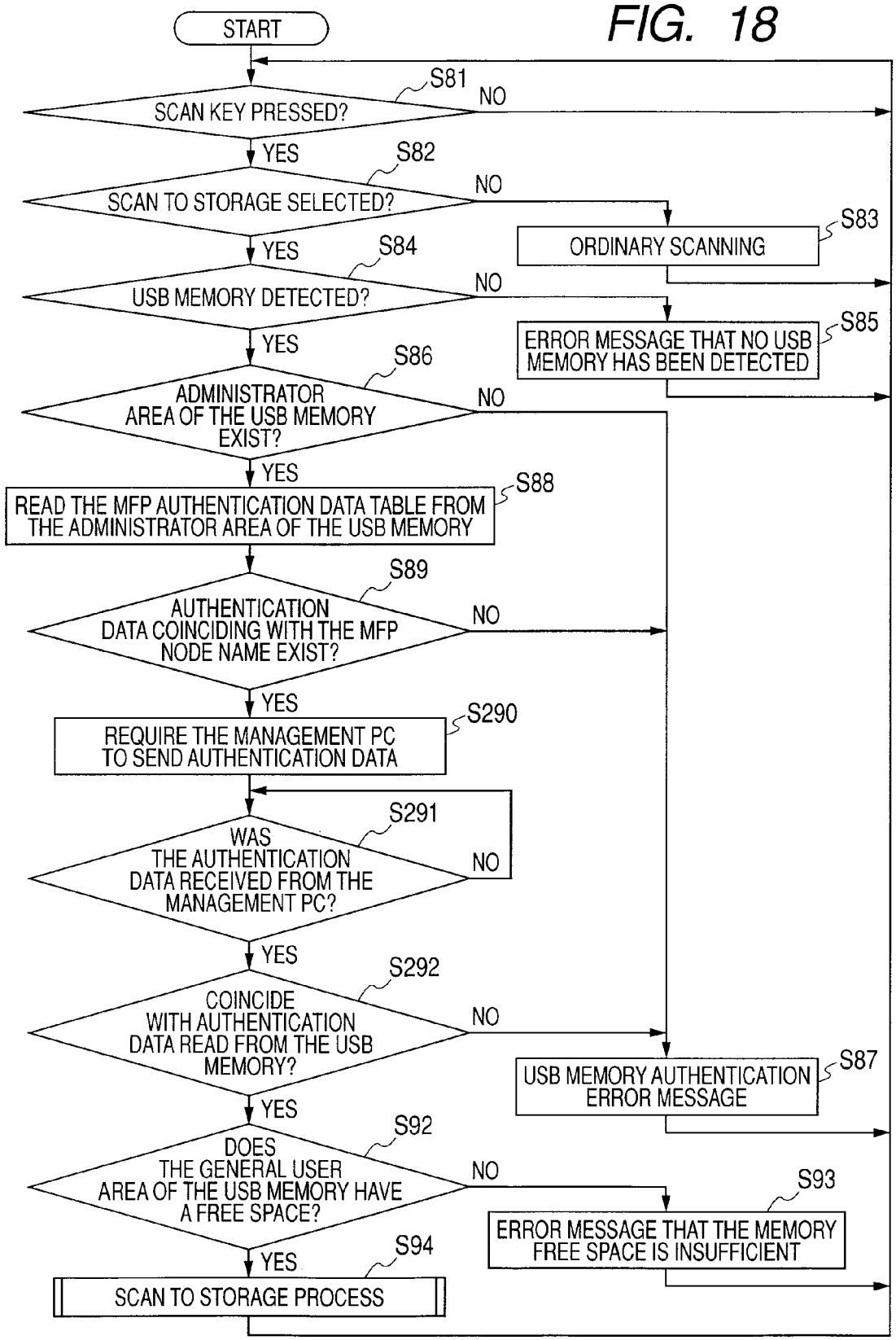
FIG. 18 is a flowchart showing an image reading process according to another embodiment.

The present invention is not limited to the above embodiment and can be embodied in various forms within the scope not departing from the scope of the present invention. For example, in the above embodiment, the management PC 70 performs a collation between the authentication data of the MFP authentication data table and the authentication data 113 recorded on the USB memory 100. However, this collation may be performed at the MFP 1. FIG. 18 is a flowchart showing such an embodiment. The following description provides only modified points, i.e., only differences between the flowchart of FIG. 15 and that of FIG. 18.

In this embodiment, as shown in FIG. 18, if authentication data 113 that coincides with the MFP node name of a relevant MFP 1 exists in the MFP authentication data table 111 read from the USB memory 100 (S89: Y), the MFP 1 requests the management PC 70 to provide authentication data corresponding to the MFP node name at step S290. Accordingly, the management PC 70 sends back the authentication data corresponding to the MFP node name. At step S291, a waiting state lasts until the authentication data is received from the management PC 70 (S291: N). If the authentication data is received from the management PC 70 (S291: Y), at step S292, the CPU 61 determines whether the authentication data 113 read from the USB memory 100 coincides with the authentication data received from the management PC 70. If these authentication data coincide with each other (S292: Y), the process proceeds to step S92 mentioned above. If these authentication data do not coincide with each other (S292: N), the process proceeds to step S93 mentioned above.

The similar effect as in the aforementioned embodiment is created in this case. It should be noted that a collation between the read authentication data and the received authentication data is performed at the MFP 1 in this embodiment, and hence the load of the management PC 70 can be reduced, thus bringing about effectiveness when the single management PC 70 manages a lot of MFPs 1. In this embodiment, the process of steps S290 to S292 corresponds to an example of functions of a permission determining unit, and the process of allowing the management PC to send back the authentication data at step S290 corresponds to an example of functions of a recording permission information transmitting unit.

Figure 19:
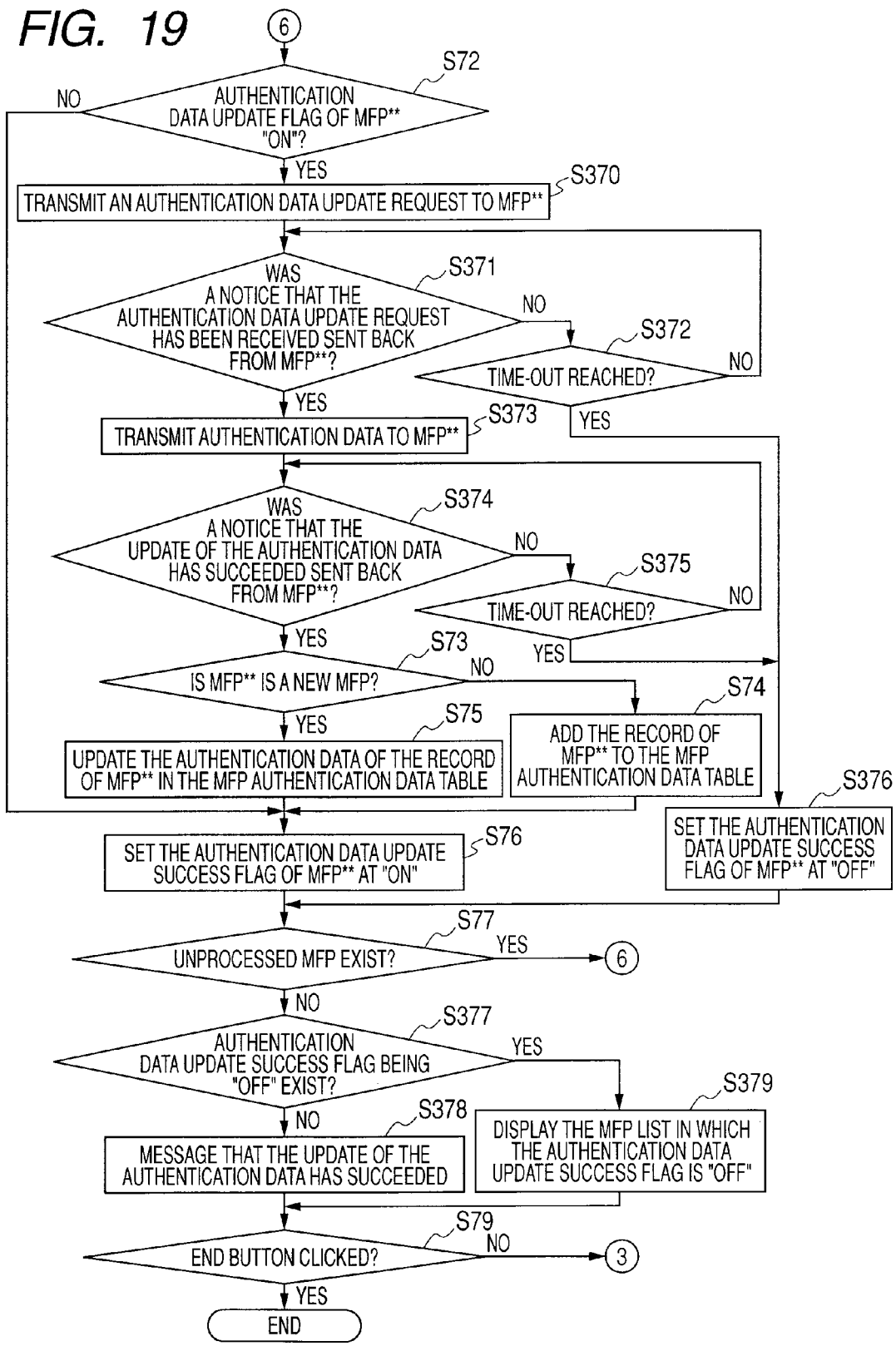
FIG. 19 is a flowchart showing a part of the process of the management application according to still another embodiment.
Figure 20:
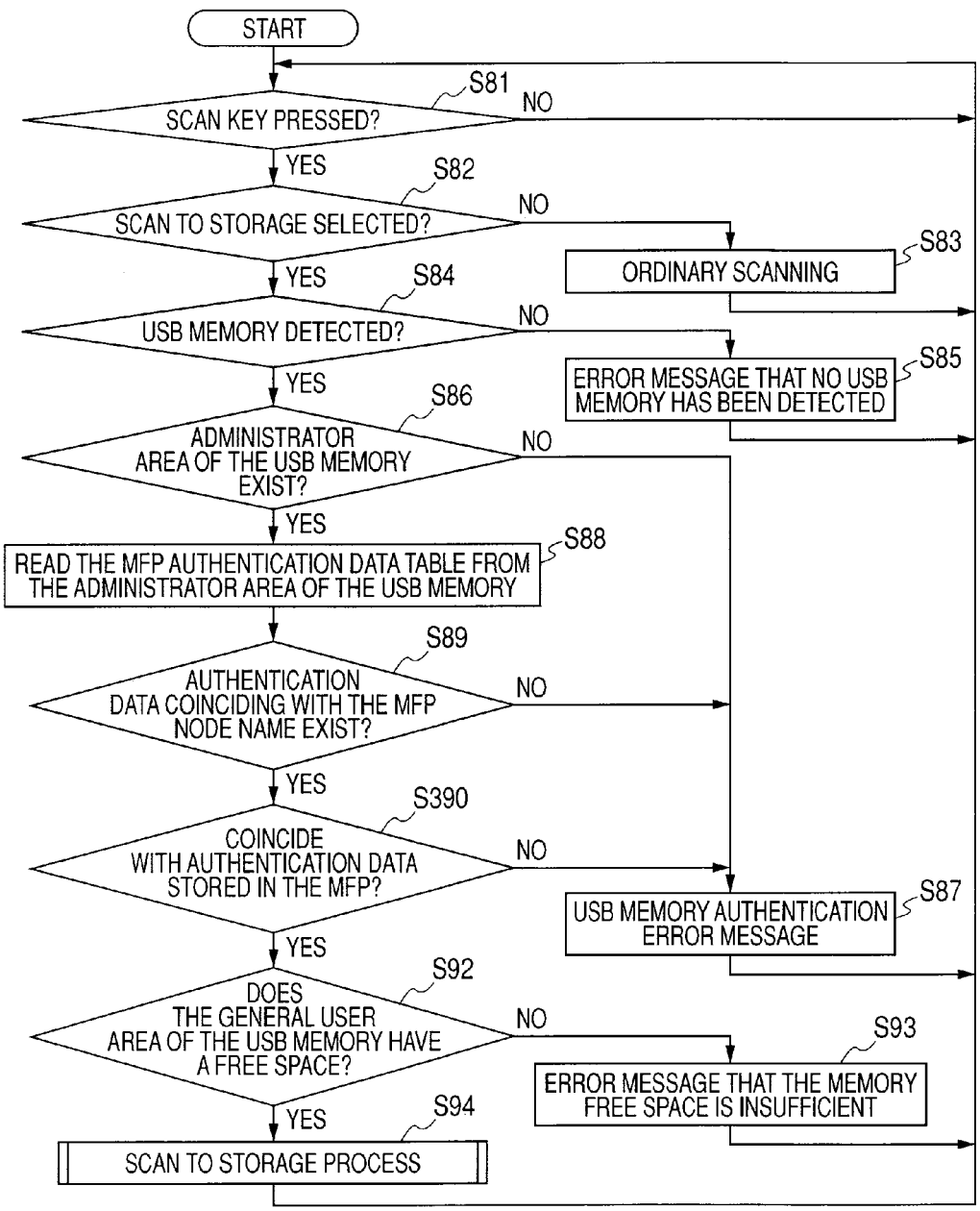
FIG. 20 is a flowchart showing an image reading process according to the still another embodiment.

Another possible method of performing a collation between those authentication data at the MFP 1 is to previously download the MFP authentication data table stored in the NVRAM 74 of the management PC 70 to the MFP 1. FIGS. 19 and 20 are flowcharts showing such an embodiment. The following description provides only modified points, i.e., only differences between the flowcharts of FIGS. 12 and 15 and those of FIGS. 19 and 20.

In this embodiment, as shown in FIG. 19, if the authentication data update flag of an MFP is in an "ON" state (S72: Y), the management PC 70 transmits an authentication data update request to the MFP. Accordingly, the MFP sends back a notice that the authentication data update request has been received to the management PC 70. Therefore, at step S371 subsequent thereto, the CPU 71 determines whether a notice that the authentication data update request has been received is sent back from the MFP. If not sent back (S371: N), the CPU 71 determines whether a time-out has been reached at step S372. If not reached (S372: N), the process again proceeds to step S371, and a waiting state lasts until a notice that the authentication data update request has been received is sent back from the MFP** and until a time-out is reached by the loop operation of steps S371 and S372.

If a notice that the authentication data update request has been received is sent back from the MFP (S371: Y) before a time-out is reached (S372: N), the management PC 70 transmits the authentication data to the MFP at step S373. The MFP** receives this authentication data, then updates its MFP authentication data table stored in the NVRAM 64, and sends back a notice that the update of the authentication data has succeeded to the management PC 70. Accordingly, at steps S374 and S375, a waiting state lasts until the notice that the update of the authentication data has succeeded is sent back and until a time-out is reached by the similar loop operation as at steps S371 and S372.

If an authentication data update success notice is sent back from the MFP (S374: Y) before a time-out is reached (S375: N), the process proceeds to step S73 mentioned above. If a time-out is reached under a waiting state during either loop operation (S372: Y, or S375: Y), the authentication data update success flag of the MFP is set at "OFF" at step S376, and the process proceeds to step S77 mentioned above.

If the process of steps S72 to S376 applied to all of the MFPs 1 mentioned on the authentication USB supported MFP list is completed (S77: N), the CPU 71 determines whether there are MFPs 1 in which the authentication data update success flag is in an "OFF" state at step S377. If no MFP 1 in which the authentication data update success flag is in an "OFF" state exists (S377: N), an authentication data update success message is displayed on the display unit 77 at step S378, and the process proceeds to step S79 mentioned above. If there are MFPs 1 in which the authentication data update success flag is in an "OFF" state (S377: Y), a list of MFPs 1 with "OFF" of the authentication data update success flag is displayed on the display unit 77 at step S379, and the process proceeds to step S79 mentioned above.

Since the MFP 1 in this embodiment stores the MFP authentication data table in its NVRAM 74 (which is an example of the recording permission information storage unit) through the aforementioned process shown in FIG. 19, the process in the MFP 1 is as shown in FIG. 20. In detail, if authentication data 113 that coincides with the MFP node name of own MFP 1 exists in the MFP authentication data table 111 read from the USB memory 100 (S89: Y), the CPU 61 determines whether the authentication data stored in the NVRAM 74 of the MFP 1 coincides with the authentication data 113 read from the USB memory 100 at step S390. If these authentication data coincide with each other (S390: Y), the process proceeds to step S92 mentioned above. If these authentication data do not coincide with each other (S390: N), the process proceeds to step S87 mentioned above.

The similar effect as in the aforementioned embodiments is created in this case. Likewise, a collation between both the authentication data is performed at the MFP 1 in this embodiment, and hence the load of the management PC 70 can be reduced, thus bringing about effectiveness when the single management PC 70 manages a lot of MFPs 1. Additionally, in this embodiment, the authentication data can be collated off-line after the authentication data is updated. Therefore, even when communication with the management PC 70 becomes impossible, the scan to storage process (S94) can be performed. In this embodiment, the process of step S390 corresponds to an example of functions of a permission determining unit, and the process of step S373 corresponds to an example of functions of a recording permission information transmitting unit, respectively. Needless to say, the present invention is not limited to the above-mentioned embodiments and can be embodied in various forms.

According to an embodiment of the invention, an image reading apparatus includes a reading unit that reads an image, a memory interface unit to which an external memory is removably connected, and a data recording unit configured to record data corresponding to the image read by the reading unit on the external memory connected to the memory interface unit. Further, the image reading apparatus includes a permission information obtaining unit configured to obtain permission information previously stored in the external memory from the external memory and a permission determining unit configured to determine whether the permission information obtained by the permission information obtaining unit is valid. In the image reading apparatus, the data recording unit records the data on the external memory if the permission determining unit determines that the permission information is valid.

In this image reading apparatus, the permission information obtaining unit reads out permission information previously stored in the external memory, and the permission determining unit determines whether the permission information read out by the permission information obtaining unit is valid. The data recording unit records data corresponding to the image read by the permission information obtaining unit on the external memory if the permission determining unit determines that the permission information is valid.

Therefore, in the image reading apparatus, only an external memory in which valid permission information is stored can record data corresponding to an image, thereby preventing the production of a great flood of external memories on which data corresponding to the image is recorded.

The image reading apparatus may further include a recording permission information storage unit that stores recording permission information that is collated with the permission information in order to allow the permission determining unit to make a determination. In this case, the permission determining unit determines whether the permission information is valid by making a collation between permission information read from the external memory and the recording permission information stored in the recording permission information storage unit. Additionally, in this case, since the image reading apparatus itself includes the recording permission information storage unit that stores recording permission information, a determination whether the permission information is valid can be made off-line.

The image reading apparatus may be configured to communicate with a host apparatus that stores recording permission information for to be collated with the permission information in order to allow the permission determining unit to make a determination. In the image reading apparatus, the permission determining unit may receive the recording permission information corresponding to the permission information from the host apparatus by communicating with the host apparatus, and may determine whether the permission information is valid. In this case, the permission determining unit receives the recording permission information corresponding to the permission information from the host apparatus by communicating with the host apparatus and determines whether the permission information is valid by making a collation between the recording permission information and the permission information of the external memory. Therefore, in this case, even if the image reading apparatus itself does not previously store the recording permission information, a determination whether the permission information is valid can be made on-line by communicating with the host apparatus.

Further, the image reading apparatus may be configured to communicate with a host apparatus that can make a collation between the permission information and recording permission information corresponding to the permission information, and the permission determining unit may transmit the permission information to the host apparatus by communicating with the host apparatus and may determine whether the permission information is valid by receiving a collation result from the host apparatus. In this case, the permission determining unit transmits the permission information read from the external memory to the host apparatus and determines whether the permission information is valid by receiving a collation result between the permission information and the recording permission information from the host apparatus. Therefore, likewise, in this case, even if the image reading apparatus itself does not previously store the recording permission information, a determination whether the permission information is valid can be made on-line by communicating with the host apparatus.

The image reading apparatus may further include a memory detecting unit configured to detect whether the external memory has been connected to the interface unit, and the permission information obtaining unit may read out the permission information when the memory detecting unit detects that the external memory has been connected to the interface unit. In this case, when the external memory is not connected to the interface unit, a permission information readout step is not executed, and hence the process can be swiftly performed.

In the image reading apparatus, the permission information may be stored in the external memory in association with individual information for specifying an individual of the image reading apparatus, and the permission determining unit may determine whether the permission information is valid when the permission information associated with the individual information corresponding to the image reading apparatus is stored in the external memory and may determine that the permission information stored in the external memory is invalid if the permission information associated with the individual information corresponding to the image reading apparatus is not stored therein. In this case, if permission information associated with individual information corresponding to the relevant image reading apparatus is not stored in the external memory, a determination that the permission information of the external memory are evenly invalid is made, and hence the process can be swiftly performed.

A host apparatus of an embodiment is connected to be capable of communicating with the image reading apparatus including the recording permission information storage unit or capable of communicating with the image reading apparatus in which the permission determining unit receives recording permission information, and the host apparatus includes a first memory interface unit to which the external memory is removably connected, a permission information recording unit configured to record the permission information to the external memory connected to the first memory interface unit, and a recording permission information transmitting unit configured to transmit the recording permission information to the image reading apparatus.

In the host apparatus, since the permission information recording unit records the permission information to the external memory connected to the first memory interface unit, the host apparatus can mange the external memory which can record data corresponding to the image. Additionally, in the host apparatus, since the recording permission information transmitting unit transmits the recording permission information to the image reading apparatus, the recording permission information stored in the recording permission information storage unit can be updated, and the permission determining unit that receives the recording permission information can be allowed to function excellently.

A host apparatus of an embodiment is connected to be capable of communicating with the image reading apparatus in which the permission determining unit transmits permission information and receives a collation result, and the host apparatus includes a first memory interface unit to which the external memory is removably connected, a permission information recording unit configured to record the permission information to the external memory connected to the first memory interface unit, a collating unit configured to make a collation between the permission information and the recording permission information corresponding to the permission information when the permission information is transmitted from the image reading apparatus, and a collation result transmitting unit configured to transmit a collation result obtained by the collating unit to the image reading apparatus.

In the host apparatus, since the permission information recording unit records the permission information to the external memory connected to the first memory interface unit, the host apparatus can mange the external memory which can record data corresponding to the image. Additionally, in the host apparatus, when the permission information is transmitted from the image reading apparatus, the collating unit makes a collation between the permission information and recording permission information corresponding to this permission information, and the collation result transmitting unit transmits a collation result to the image reading apparatus. Therefore, the permission determining unit of the image reading apparatus can be allowed to function excellently.

In the host apparatus, when the permission information is recorded by the permission information recording unit, a storage area of the external memory is divided into a first area where the permission information is recorded, a second area where data corresponding to the image is recorded, and a third area where data can be read and written regardless of whether the permission information is valid. In this case, since the storage area of the external memory is divided into the first area where the permission information is recorded, the second area where data corresponding to the image is recorded, and the third area where data can be read and written regardless of whether the permission information is valid, the reading and writing of data can be performed more smoothly. Additionally, since there is provided the third area where data can be read and written regardless of whether the permission information is valid, this external memory can be used in the similar manner as a general external memory.

Additionally, in an image reading system of an embodiment, the image reading apparatus including the recording permission information storage unit or the image reading apparatus in which the permission determining unit receives recording permission information is connected to be capable of communicating with the host apparatus including the first memory interface unit, the permission information recording unit and the recording permission information transmitting unit.

In the image reading system, the host apparatus can collectively the external memory which can record data corresponding to the image as described above, and the recording permission information stored in the recording permission information storage unit of the image reading apparatus can be updated, or the permission determining unit that receives recording permission information can be allowed to function excellently.

In the image reading system, the image reading apparatus in which the permission determining unit transmits permission information and receives a collation result may be connected to be capable of communicating with the host apparatus including the first memory interface unit, the permission information recording unit, the collating unit, and the collation result transmitting unit.

In the image reading system, the host apparatus can collectively mange the external memory that can record data corresponding to the image as described above, and the permission determining unit of the image reading apparatus can be allowed to function excellently.

What is claimed is:
1. An image reading apparatus comprising:
a reading unit that reads an image;
a memory interface unit to which an external memory is removably connected, the external memory storing permission information;
a permission information obtaining unit configured to obtain the permission information from the external memory;
a permission determining unit configured to determine whether the obtained permission information is valid; and a data recording unit configured to record data corresponding to the image on the external memory connected to the memory interface unit if the obtained permission information is valid.

2. The image reading apparatus according to claim 1, further comprising a recording permission information storage unit that stores recording permission information, wherein the permission determining unit is configured to:
collate the obtained permission information with the recording permission information; and
determine whether the obtained permission information is valid based on a collation result.

3. The image reading apparatus according to claim 2,
wherein the recording permission information storage unit stores the recording permission information, which has the same format as the permission information, and
wherein the permission determining unit determines that the obtained permission information is valid if the obtained permission information coincides with the recording permission information.

4. The image reading apparatus according to claim 1, further comprising a communication interface unit connectable to a host apparatus that stores recording permission information,
wherein the permission determining unit is configured to:
receive the recording permission information from the host apparatus;
collate the obtained permission information with the recording permission information; and
determine whether the obtained permission information is valid based on a collation result.

5. The image reading apparatus according to claim 1, further comprising a communication interface unit connectable to a host apparatus that stores recording permission information and collates the obtained permission information with the recording permission information,
wherein the permission determining unit transmits the obtained permission information to the host apparatus and receives a collation result from the host apparatus through the communication interface unit, and
wherein the permission determining unit determines whether the obtained permission information is valid based on the collation result.

6. The image reading apparatus according to claim 1, further comprising a memory detecting unit configured to detect whether the external memory is connected to the memory interface unit,
wherein the permission information obtaining unit obtains the permission information from the external memory when the detecting unit detects that the external memory is connected to the memory interface unit.

7. The image reading apparatus according to claim 1,
wherein the permission information is stored in the external memory in association with individual information to specify an individual of the image reading apparatus, and
wherein the permission determining unit determines whether the permission information associated with the individual information corresponding to the image reading apparatus is valid.

8. The image reading apparatus according to claim 7, wherein the permission determining unit determines that the permission information is invalid if the permission information associated with the individual information corresponding to the image reading apparatus is not stored in the external memory.

9. A host apparatus comprising:
a first memory interface unit to which an external memory is removably connected;
a permission information recording unit configured to record permission information on the external memory connected to the first memory interface unit;
a first communication interface unit connectable to an image reading apparatus that includes:
a reading unit that reads an image;
a second memory interface unit to which the external memory is removably connected;
a permission information obtaining unit configured to obtain the permission information from the external memory connected to the second memory interface unit;
a permission determining unit configured to collate the obtained permission information with recording permission information and determine whether the obtained permission information is valid based on a collation result; and
a data recording unit configured to record data corresponding to the image on the external memory connected to the second memory interface unit if the obtained permission information is valid; and
a recording permission information transmitting unit configured to transmit the recording permission information to the image reading apparatus through the first communication interface unit.

10. The host apparatus according to claim 9, wherein when the permission information is recorded by the permission information recording unit, a storage area of the external memory is divided into a first area where the permission information is recorded, a second area where the data corresponding to the image is recorded and a third area where data can be read and written regardless of whether the permission information is valid.

11. The host apparatus according to claim 9, wherein the recording permission information transmitting unit transmits the recording permission information to the image reading apparatus when the recording permission information is updated.

12. The host apparatus according to claim 9, wherein the recording permission information transmitting unit transmits the recording permission information to the image reading apparatus in response to a request transmitted from the image reading apparatus.

13. A host apparatus comprising:
a first memory interface unit to which an external memory is removably connected;
a permission information recording unit configured to record permission information on the external memory connected to the first memory interface unit;
a first communication interface unit connectable to an image reading apparatus that includes:
a reading unit that reads an image;
a second memory interface unit to which the external memory is removably connected;
a permission information obtaining unit configured to obtain the permission information from the external memory connected to the second memory interface unit;
a permission determining unit configured to transmit the obtained permission information to the host apparatus and receive a collation result from the host apparatus and determine whether the obtained permission information is valid based on the collation result; and a data recording unit configured to record data corresponding to the image on the external memory connected to the second memory interface unit if the obtained permission information is valid;

a recording permission information storing unit that stores recording permission information;

a collating unit configured to collate the obtained permission information transmitted from the image reading apparatus and the recording permission information; and a collation result transmitting unit configured to transmit the collation result obtained by the collating unit to the image reading apparatus.

14. The host apparatus according to claim 13, wherein when the permission information is recorded by the permission information recording unit, a storage area of the external memory is divided into a first area where the permission information is recorded, a second area where the data corresponding to the image is recorded and a third area where data can be read and written regardless of whether the permission information is valid.

15. An image reading system comprising a host apparatus and an image reading apparatus configured to communicate with the host apparatus, wherein the host apparatus includes:
a first memory interface unit to which an external memory is removably connected;
a permission information recording unit configured to record the permission information on the external memory connected to the first interface unit; and
a recording permission information transmitting unit configured to transmit recording permission information to the image reading apparatus, and wherein the image reading apparatus includes:
a reading unit that reads an image;
a second memory interface unit to which the external memory is removably connected;
a permission information obtaining unit configured to obtain the permission information from the external memory connected to the second memory interface unit;
a permission determining unit configured to collate the obtained permission information with the recording permission information and determine whether the obtained permission information is valid based on a collation result; and
a data recording unit configured to record data corresponding to the image on the external memory connected to the second memory interface unit if the obtained permission information is valid.

16. An image reading system comprising:
a host apparatus; and
an image reading apparatus configured to communicate with the host apparatus, wherein the host apparatus includes:
a first memory interface unit to which an external memory is removably connected;
a permission information recording unit configured to record permission information on the external memory connected to the first memory interface unit;
a recording permission information storing unit that stores recording permission information;
a collating unit configured to collate obtained permission information obtained by and transmitted from the image reading apparatus and the recording permission information; and
a collation result transmitting unit configured to transmit the collation result obtained by the collating unit to the image reading apparatus, and wherein the image reading apparatus includes:
a reading unit that reads an image;
a second memory interface unit to which the external memory is removably connected;
a permission information obtaining unit configured to obtain the permission information from the external memory connected to the second memory interface unit;
a permission determining unit configured to:
transmit the obtained permission information to the host apparatus and receive the collation result from the host apparatus; and
determine whether the obtained permission information is valid based on the collation result; and
a data recording unit configured to record data corresponding to the image on the external memory connected to the second memory interface unit if the obtained permission information is valid.

* * * * *